US012768653B2

(12) United States Patent
Trivedi et al.

(10) Patent No.: US 12,768,653 B2
(45) Date of Patent: Oct. 20, 2026

(54) INERTIAL NAVIGATION AIDED WITH MULTI-INTERVAL POSE MEASUREMENTS

(71) Applicant: QUALCOMM Incorporated, San Diego, CA (US)

(72) Inventors: Nisarg Keyurbhai Trivedi, Santa Clara, CA (US); Diyan Teng, Sunnyvale, CA (US); Junsheng Han, Los Altos Hills, CA (US); Victor Kulik, San Jose, CA (US); Rashmi Kulkarni, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 18/354,204

(22) Filed: Jul. 18, 2023

(65) Prior Publication Data

US 2025/0027773 A1 Jan. 23, 2025

(51) Int. Cl.

*G01C 21/16* (2006.01)
*G06N 20/00* (2019.01)

(52) U.S. Cl.

CPC ............. *G01C 21/16* (2013.01); *G06N 20/00* (2019.01)

(58) Field of Classification Search

CPC ................................ G01C 21/16; G06N 20/00
USPC .......................................................... 701/500
See application file for complete search history.

(56) References Cited

U.S. PATENT DOCUMENTS

| | | | | |
|---|---|---|---|---|
| 9,243,916 | B2 * | 1/2016 | Roumeliotis | G06T 7/70 |
| 9,607,401 | B2 * | 3/2017 | Roumeliotis | G06T 7/248 |
| 9,658,070 | B2 * | 5/2017 | Roumeliotis | G05D 1/0246 |
| 9,709,404 | B2 * | 7/2017 | Roumeliotis | G06T 7/277 |
| 9,766,074 | B2 * | 9/2017 | Roumeliotis | G05D 1/00 |
| 10,012,504 | B2 * | 7/2018 | Roumeliotis | G01C 21/1656 |
| 10,371,529 | B2 * | 8/2019 | Roumeliotis | G06V 20/56 |
| 11,276,183 | B2 * | 3/2022 | Lin | G06T 7/74 |
| 11,797,999 | B1 * | 10/2023 | Mantin | G06Q 40/02 |
| 11,852,729 | B2 * | 12/2023 | Hansen | G01S 17/931 |
| 12,196,873 | B1 * | 1/2025 | Pratt | G01C 21/38 |

(Continued)

FOREIGN PATENT DOCUMENTS

| | | | | |
|---|---|---|---|---|
| EP | 4194881 A1 | | 6/2023 | |
| WO | WO 2022146424 | | 7/2022 | |
| WO | WO-2023057780 A1 | * | 4/2023 | G01C 21/16 |

OTHER PUBLICATIONS

Bruce D. Lucas and Takeo Kanade, An iterative image registration technique with an application to stereo vision, In Proc. of the International Joint Conference on Artificial Intelligence, pp. 674-679, Vancouver, British Columbia, Aug. 24-28, 1981.*

(Continued)

*Primary Examiner* — Andrew R Dyer
(74) *Attorney, Agent, or Firm* — Weaver Austin Villeneuve & Sampson LLP

(57) ABSTRACT

Techniques for inertial navigation aided with multi-interval pose measurements are disclosed. The techniques can include obtaining inertial measurement unit (IMU) data from an IMU, generating, based on the IMU data, a respective pose measurement vector according to each of a plurality of machine-learning models, resulting in a plurality of pose measurement vectors, wherein each of the plurality of pose measurement vectors is associated with a respective one of multiple motion classes, and determining a device pose estimate based on the IMU data and the plurality of pose measurement vectors.

30 Claims, 13 Drawing Sheets

(56) References Cited

U.S. PATENT DOCUMENTS

| | | | | |
|---|---|---|---|---|
| 2009/0276729 | A1* | 11/2009 | Cantu-Paz | G06F 16/954 715/811 |
| 2017/0343356 | A1* | 11/2017 | Roumeliotis | H04W 4/027 |
| 2018/0231385 | A1* | 8/2018 | Fourie | G01C 21/188 |
| 2019/0362557 | A1* | 11/2019 | Lacey | G06T 5/20 |
| 2020/0219000 | A1* | 7/2020 | Wen | G05D 1/027 |
| 2020/0302634 | A1* | 9/2020 | Pollefeys | G06T 7/70 |
| 2021/0080924 | A1* | 3/2021 | Labisch | G06N 20/00 |
| 2021/0201526 | A1* | 7/2021 | Moloney | G06N 3/084 |
| 2021/0256406 | A1* | 8/2021 | Mueller | G06N 7/01 |
| 2022/0051031 | A1* | 2/2022 | Li | G06V 20/56 |
| 2022/0101155 | A1* | 3/2022 | Beaudoin | G06N 5/04 |
| 2022/0250646 | A1 | 8/2022 | Kobilarov | |
| 2022/0253133 | A1 | 8/2022 | Barak et al. | |
| 2022/0270288 | A1* | 8/2022 | Qu | G06V 20/588 |
| 2022/0350365 | A1* | 11/2022 | Levine | G01P 3/00 |
| 2022/0350991 | A1* | 11/2022 | Vesperman | G06V 20/188 |
| 2022/0414932 | A1* | 12/2022 | Chen | G06T 7/579 |
| 2023/0088884 | A1* | 3/2023 | Mohamad | G01C 21/20 345/633 |
| 2023/0194265 | A1* | 6/2023 | Roumeliotis | G06F 17/16 701/472 |
| 2024/0221216 | A1* | 7/2024 | Powers | G06V 20/20 |
| 2024/0271939 | A1* | 8/2024 | Cao | G01C 21/1656 |
| 2024/0303298 | A1* | 9/2024 | Chen | G06V 10/82 |
| 2024/0418530 | A1* | 12/2024 | Hammond | G01C 21/3859 |
| 2025/0060216 | A1* | 2/2025 | Thompson | A62B 9/00 |

OTHER PUBLICATIONS

Laurent Kneip, Margarita Chli, and Roland Siegwart, Robust Real-Time Visual Odometry with a Single Camera and an IMU, In Proc. of the British Machine Vision Conference, pp. 16.1-16.11, Dundee, Scotland, Aug. 29-Sep. 2, 2011.*

International Search Report and Written Opinion—PCT/US2024/036546—ISA/EPO—Oct. 14, 2024.

Liu W., et al., "TLIO: Tight Learned Inertial Odometry", IEEE Robotics and Automation Letters, vol. 5, No. 4, Oct. 2020, pp. 5653-5660.

Mahfouz S., et al., "Target Tracking Using Machine Learning and Kalman Filter in Wireless Sensor Networks", IEEE Sensors Journal, vol. 14, No. 10, Oct. 2014, pp. 3715-3725.

Nobrega J.P., et al., "A Combination Forecasting Model Using Machine Learning and Kalman Filter for Statistical Arbitrage", 2014 IEEE International Conference on Systems, Man, and Cybernetics, Oct. 5-8, 2014, San Diego, CA, USA, 7 Pages.

* cited by examiner

500

505

510

515

520

700

INERTIAL NAVIGATION AIDED WITH MULTI-INTERVAL POSE MEASUREMENTS

BACKGROUND

1. Field of Disclosure

Aspects of the present disclosure generally relate to inertial navigation and, more specifically, to inertial navigation using machine-learning models.

2. Description of Related Art

With respect to a contemporary mobile device (such as a smartphone, for example) six degrees of freedom (6DoF) pose tracking capabilities can be a valuable feature to support applications such as augmented/extended reality, autonomous vehicle control, immersive gaming, health and fitness monitoring, autonomous package handling, robotics, and others. In conjunction with 6DoF pose tracking, estimates of translational and rotational motion of a mobile device can be inferred from inertial measurements provided by an inertial measurement unit (IMU). It may be possible to improve the accuracy of IMU-based pose tracking via multimodal sensor fusion, according to which additional modalities (such as camera imaging and global navigation satellite system (GNSS) location estimation) may be used in concert with motion estimation based on IMU data. However, pose tracking using multimodal sensor fusion may consume more power, and depending on the additional modalities used, may be unreliable under some conditions.

BRIEF SUMMARY

An example method for inertial navigation, according to this disclosure, may include obtaining inertial measurement unit (IMU) data from an IMU, generating, based on the IMU data, a respective pose measurement vector according to each of a plurality of machine-learning models, resulting in a plurality of pose measurement vectors, wherein each of the plurality of pose measurement vectors is associated with a respective one of multiple motion classes, and determining a device pose estimate based on the IMU data and the plurality of pose measurement vectors.

An example apparatus for inertial navigation aided with multi-interval pose measurements, according to this disclosure, may include an IMU, a transceiver, a memory, and one or more processors communicatively coupled with the transceiver and the memory, wherein the one or more processors are configured to obtain IMU data from the IMU, generate, based on the IMU data, a respective pose measurement vector according to each of a plurality of machine-learning models, resulting in a plurality of pose measurement vectors, wherein each of the plurality of pose measurement vectors is associated with a respective one of multiple motion classes, and determine a device pose estimate based on the IMU data and each of the plurality of pose measurement vectors.

An example apparatus for inertial navigation aided with multi-interval pose measurements, according to this disclosure, may include means for obtaining inertial measurement unit (IMU) data from an IMU, means for generating, based on the IMU data, a respective pose measurement vector according to each of a plurality of machine-learning models, resulting in a plurality of pose measurement vectors, wherein each of the plurality of pose measurement vectors is associated with a respective one of multiple motion classes, and means for determining a device pose estimate based on the IMU data and each of the plurality of pose measurement vectors.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
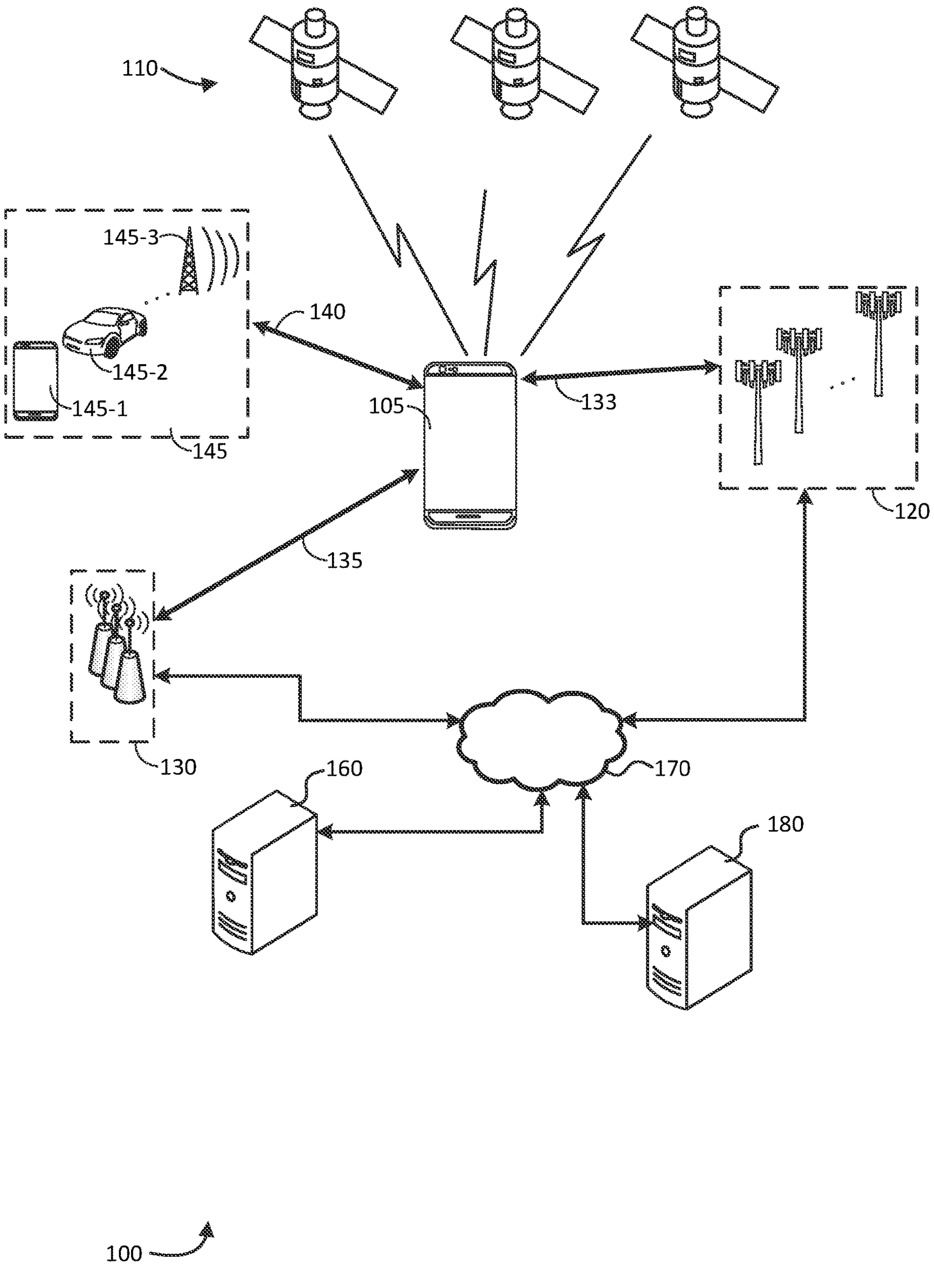
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE). As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may refer to absolute location determination, relative location determination, ranging, or a combination thereof. Such positioning may include and/or be based on timing, angular, phase, or power measurements, or a combination thereof (which may include RF sensing measurements) for the purpose of location or sensing services.

Various aspects relate generally to inertial navigation, and more particularly to the use of machine-learning modeling to aid inertial navigation. Some aspects more specifically relate to machine-learning model-based inertial navigation using estimation filtering. In some examples, the estimation filtering can be performed using linear quadratic estimation (also known as Kalman filtering). According to some aspects, in conjunction with conducting inertial navigation for a mobile device, a pose estimation engine can determine device pose estimates based on pose measurement vectors generated according to multiple different machine-learning models. Each machine-learning model can be associated with a respective one of multiple motion classes, and can produce pose measurement vectors according to a time interval value associated with its motion class. In some examples, the pose measurement vectors can describe current pose characteristics, such as current positions, orientations, linear or angular velocities, or the like. In other examples, the pose measurement vectors can be delta measurements that indicate changes in pose characteristics over intervals in time, such as linear or angular displacements, differences in linear or angular velocities, or the like. According to some aspects, pose measurement vectors generated according to the various machine-learning models can be used to update a multi-measurement estimation filter bank. In various examples, position and orientation measurements of the pose measurement vectors can be weighted by their associated uncertainties to determine an estimated position and orientation of the mobile device. According to aspects of the disclosure, applying multiple different machine-learning models trained for estimation of motion of various types (and various associated time interval values) can allow the pose estimation engine to achieve greater overall levels of inertial navigation accuracy.

FIG. 1 is a simplified illustration of a positioning system 100 in which a UE 105, location server 160, and/or other components of the positioning system 100 can use the techniques provided herein for inertial navigation aided with multi-interval pose measurements, according to an embodiment. The techniques described herein may be implemented by one or more components of the positioning system 100. The positioning system 100 can include: a UE 105; one or more satellites 110 (also referred to as space vehicles (SVs)), which may include Global Navigation Satellite System (GNSS) satellites (e.g., satellites of the Global Positioning System (GPS), GLONASS, Galileo, Beidou, etc.) and/or Non-Terrestrial Network (NTN) satellites; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 may be communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUS), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (cMBB), or others) that may provide access for different types of devices. In some cases, the term "cell" may refer to a portion of a geographic coverage area (e.g., a sector) over which the logical entity operates.

Satellites 110 may be utilized for positioning of the UE 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the UE 105 to perform code-based and/or carrier-based positioning, which can be highly accurate. Additionally or alternatively, satellites 110 may be utilized for NTN-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning. In some embodiments NTN nodes may include non-terrestrial vehicles such as airplanes, balloons, drones, etc., which may be in addition or as an alternative to NTN satellites.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the UE 105, or a combination thereof. Wireless signals from mobile devices 145 used for positioning of the UE 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the UE 105, such as infrared signals or other optical technologies.

Mobile devices 145 may comprise other UEs communicatively coupled with a cellular or other mobile network (e.g., network 170). When one or more other mobile devices 145 comprising UEs are used in the position determination of a particular UE 105, the UE 105 for which the position is to be determined may be referred to as the "target UE," and each of the other mobile devices 145 used may be referred to as an "anchor UE." For position determination of a target UE, the respective positions of the one or more anchor UEs may be known and/or jointly determined with the target UE. Direct communication between the one or more other mobile devices 145 and UE 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., UE 105) may be facilitated using measurements from one or more anchor devices (e.g., mobile devices 145).

According to some embodiments, such as when the UE 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location (including, e.g., the location of a base station 120 or AP 130) or some other location such as a location for UE 105 at some known previous time, or a location of a mobile device 145 (e.g., another UE) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR, etc.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Figure 2:
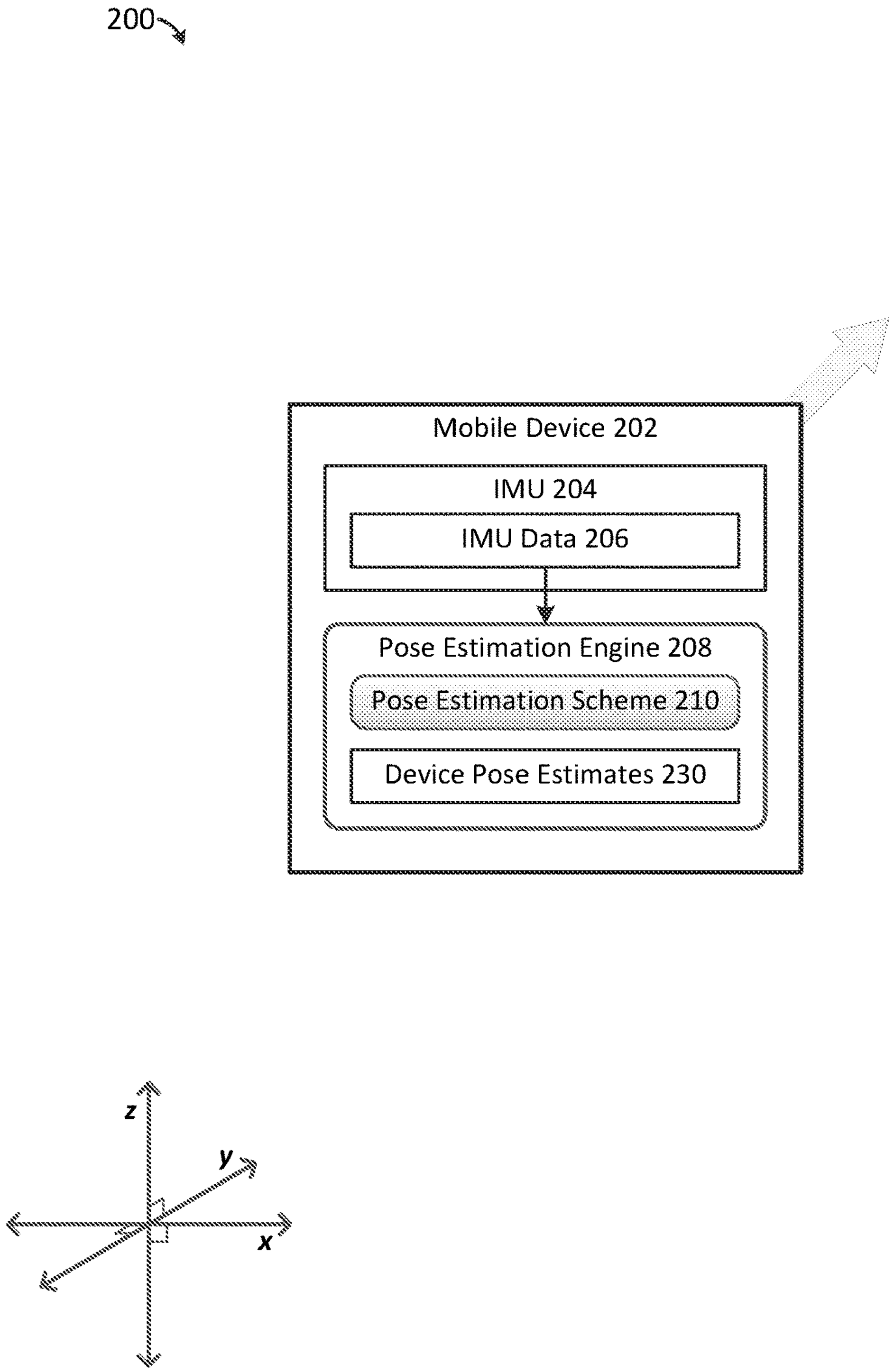
FIG. 2 is a block diagram illustrating a first example operating environment, according to aspects of the disclosure.

FIG. 2 is a block diagram illustrating an example operating environment 200 in which inertial navigation aided with multi-interval pose measurements may be implemented, according to aspects of the disclosure. In operating environment 200, a pose estimation engine 208 of a mobile device 202 conducts inertial navigation as the mobile device 202 moves in three-dimensional space. In some examples, mobile device 202 can correspond to UE 105 of FIG. 1. Mobile device 202 includes an IMU 204. As mobile device 202 moves, IMU 204 can generate IMU data 206, based on which pose estimation engine 208 can infer estimates of translational and/or rotational motion of mobile device 202. In some examples, based on IMU data 206, pose estimation engine 208 can infer estimates of translational and/or rotational motion of mobile device 202 with respect to up to six degrees of freedom. In some examples, the six degrees of freedom can correspond to translational motion along, and rotational motion about, three axes, each of which can correspond to a respective one of three directions defined by coordinate axes for the three-dimensional space. In the depicted example, the coordinate axes define an x direction, a y direction, and a z direction, and the six degrees of freedom can correspond to translational motion in the x, y, and z directions and rotational motion about the x, y, and z directions. In some examples, pose estimation engine 208 can infer estimates of translational motion of mobile device 202, but not of rotational motion of mobile device 202, or vice versa. In some examples, pose estimation engine 208 can infer estimates of one or both of translational motion and rotational motion of mobile device 202 with respect to less than three coordinate dimensions. In one example, pose estimation engine 208 may infer estimates of translational motion, rotational motion, or both, with respect to the x and z dimensions, but not with respect to the y dimension.

According to aspects of the disclosure, based on estimates of translational and/or rotational motion that it infers based on IMU data 206, pose estimation engine 208 can determine device pose estimates 230. Each device pose estimate 230 can generally indicate an estimated position and/or estimated orientation of mobile device 202 in terms of one or more dimensions of the coordinate system defined by the x, y, and z axes. According to aspects of the disclosure, in order to use IMU data 206 to determine device pose estimates 230, pose estimation engine 208 can apply a pose estimation scheme 210.

Figure 3:
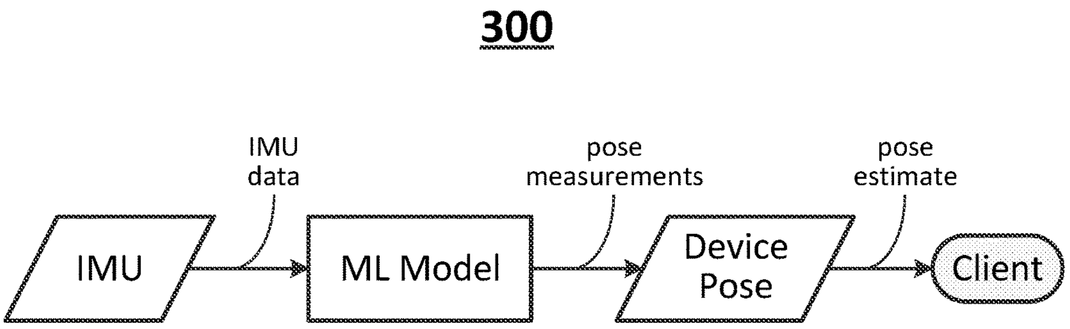
FIG. 3 is a block diagram illustrating a first example pose estimation scheme, according to aspects of the disclosure.

FIG. 3 is a block diagram illustrating an example pose estimation scheme 300. Pose estimation scheme 300 may be representative of some examples of pose estimation scheme 210 in operating environment 200 of FIG. 2. According to pose estimation scheme 300, a machine learning (ML) model is used to generate pose measurements based on IMU data provided by an IMU. The pose measurements can include three translational motion measurements (or position measurements implying those translational motion measurements), including, for each of three dimensions, a respective translational motion measurement that represents translational motion in that dimension (or a respective position measurement implying such a translational motion measurement). The pose measurements can also include three rotational motion measurements (or orientation measurements implying those rotational motion measurements), including, for each of the three dimensions, a respective rotational motion measurement that represents rotational motion about that dimension (or a respective orientation measurement implying such a rotational motion measurement). A pose estimate (which may correspond to a device pose estimate 230 in operating environment 200 of FIG. 2) is determined directly based on the pose measurements generated using the machine-learning model, and is provided to a client.

Figure 4:
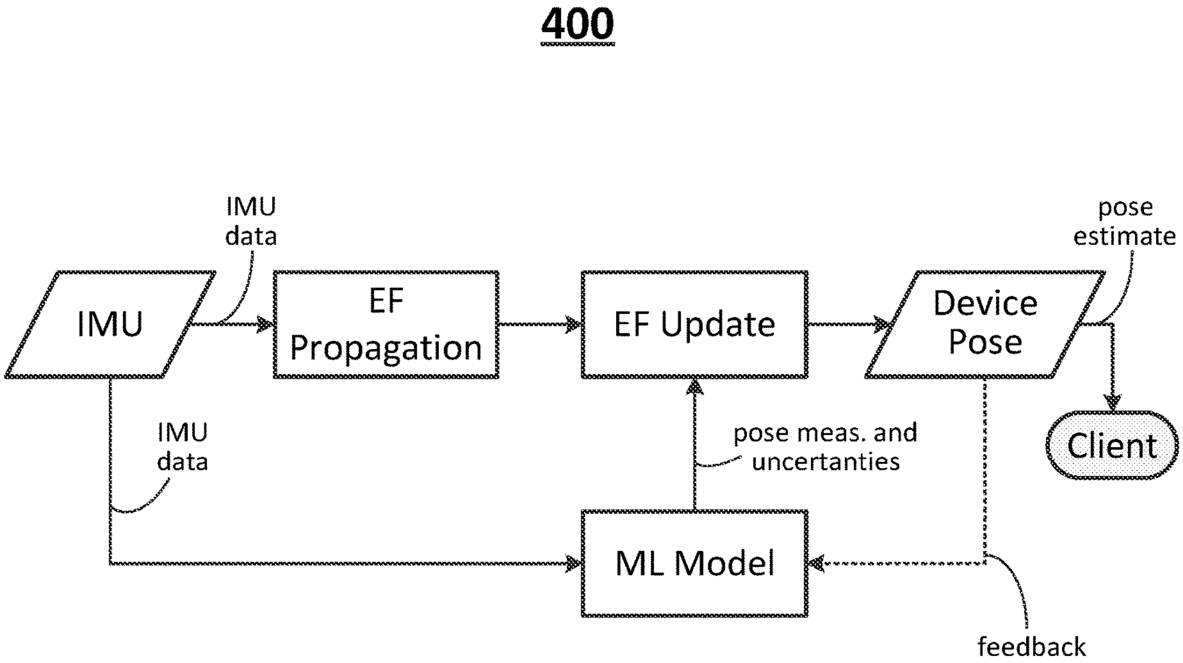
FIG. 4 is a block diagram illustrating a second example pose estimation scheme, according to aspects of the disclosure.

FIG. 4 is a block diagram illustrating an example pose estimation scheme 400. Pose estimation scheme 400 may be representative of some examples of pose estimation scheme 210 in operating environment 200 of FIG. 2. According to pose estimation scheme 400, as according to pose estimation scheme 300 of FIG. 3, a pose estimate is determined based on pose measurements generated using a machine-learning model. However, according to pose estimation scheme 400, the determination of the pose estimate is indirectly-rather than directly-based on those pose measurements.

According to pose estimation scheme 400, the pose estimate is handled as an estimated system state that is tracked and updated using an estimation filter (EF). In some examples, the estimation filter can be a Kalman filter (KF). In other examples, the estimation filter can be an estimation filter of another type, such as an extended KF (EKF), unscented KF, cubature KF, alpha-beta filter, Gaussian-sum filter, interactive multiple model filter, or particle filter. IMU data provided by an IMU is both propagated to the estimation filter and input into the machine-learning model. The machine-learning model is used to generate pose measurements and uncertainties based on the IMU data.

The pose measurements can include three translational motion measurements (or position measurements implying those translational motion measurements), including a respective translational motion measurement (or position measurement implying that translational motion measurement) for each of three dimensions, and three rotational motion measurements (or orientation measurements implying those rotational motion measurements), including a respective rotational motion measurement (or orientation measurement implying that rotational motion measurement) for each of the three dimensions. The uncertainties can include respective uncertainties for each of the three translational motion (or position) measurements and each of the three rotational motion (or orientation) measurements.

The machine-learning model can generate the pose measurements according to a time interval value. The time interval value can define an amount of time across which changes in position and orientation (as a result of translational and rotational motion, respectively) are to be measured. Thus, for example, if the machine-learning model generates the pose measurements according to a time interval value of 1 second, the pose measurements can include translational motion measurements and rotational motion measurements corresponding to changes in position and orientation, respectively, occurring over a particular 1 second interval in time.

Each time the estimation filter is updated, pose measurements and uncertainties generated using the machine-learning model serve as bases for correction of the estimated system state. Upon completion of any given update, a pose estimate can be determined based on the estimated system state and can be provided to the client. The pose estimate can also be fed back to the machine-learning model, for reference in conjunction with generating pose measurements and uncertainties for a next estimation filter update.

Figure 5A:
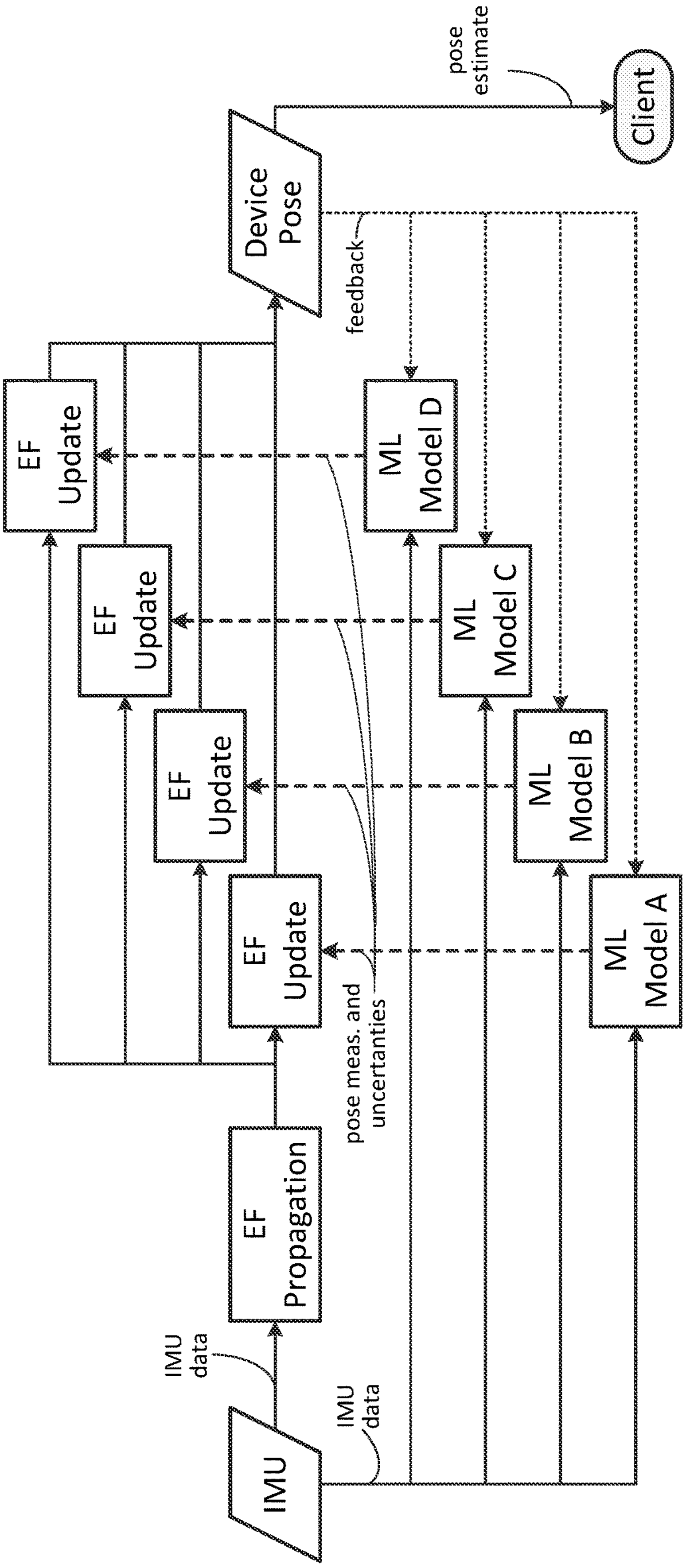
FIG. 5A is a block diagram illustrating a third example pose estimation scheme, according to aspects of the disclosure.

FIG. 5A is a block diagram illustrating an example pose estimation scheme 500. Pose estimation scheme 500 may be representative of some examples of pose estimation scheme 210 that pose estimation engine 208 can implement in operating environment 200 of FIG. 2 in accordance with techniques provided herein for inertial navigation aided with multi-interval pose measurements. According to pose estimation scheme 500, a pose estimate is determined based on pose measurements and uncertainties provided by multiple machine-learning models. Each machine-learning model can define a scheme, such as in the form of one or more functions, for determining measurements of translational and/or rotational motion of a device based on IMU data provided by an IMU of the device. In the example depicted in FIG. 5A, the pose estimation scheme 500 uses four different machine-learning models, machine-learning models A, B, C, and D. Each machine-learning model can be responsible for a different type of motion, or "motion class," such as—for example—walking, jogging, sprinting, fidgeting, hopping, skipping, etc.

Based on IMU data provided by an IMU, each machine-learning model can generate pose measurements and uncertainties associated with a different respective time interval value, which can correspond to the motion class for which that machine-learning model is responsible. For example, the machine-learning models A, B, C, and D shown in FIG. 5A may generate pose measurements and uncertainties associated with time interval values of 1, 2, 4, and 8 seconds, respectively. With respect to each machine-learning model, the applicable time interval value can define an amount of time across which that machine-learning model is to measure changes in position and orientation (resulting from translational and rotational motion, respectively). Thus, in the context of the previous example, machine-learning models A, B, C, and D can generate pose measurements that include translational motion measurements and rotational motion measurements corresponding to changes in position and orientation occurring over 1 second, 2 second, 4 second, and 8 second intervals in time, respectively.

According to pose estimation scheme 500, the pose estimate can be determined based on an estimated system state that is tracked and updated using a multi-measurement estimation filter bank. The multi-measurement estimation filter bank can be realized via the implementation of estimation filtering according to measurement and update equations that are modified to use multiple sets of pose measurements and uncertainties as inputs. In some examples, the multi-measurement estimation filter bank can be a bank of Kalman filters (a "Kalman filter bank"). In other examples, in lieu of—or in addition to—Kalman filters (KFs), the multi-measurement estimation filter bank can include estimation filters of one or more other types, such as extended KFs (EKFs), unscented KFs, cubature KFs, alpha-beta filters, Gaussian-sum filters, interactive multiple model filters, particle filters, or a combination thereof. According to aspects of the disclosure, updates of the multi-measurement estimation filter bank can be performed based on pose measurements and uncertainties generated by machine-learning models A. B, C, and D to correct the estimated system state. In this context, the translational and rotational motion measurements provided by the various machine-learning models can be weighted according to their corresponding uncertainties. Motion measurements having lesser associated levels of uncertainty can be afforded greater weights in conjunction with determining the pose estimate, and motion measurements having greater associated levels of uncertainty can be afforded lesser weights.

Figure 5B:
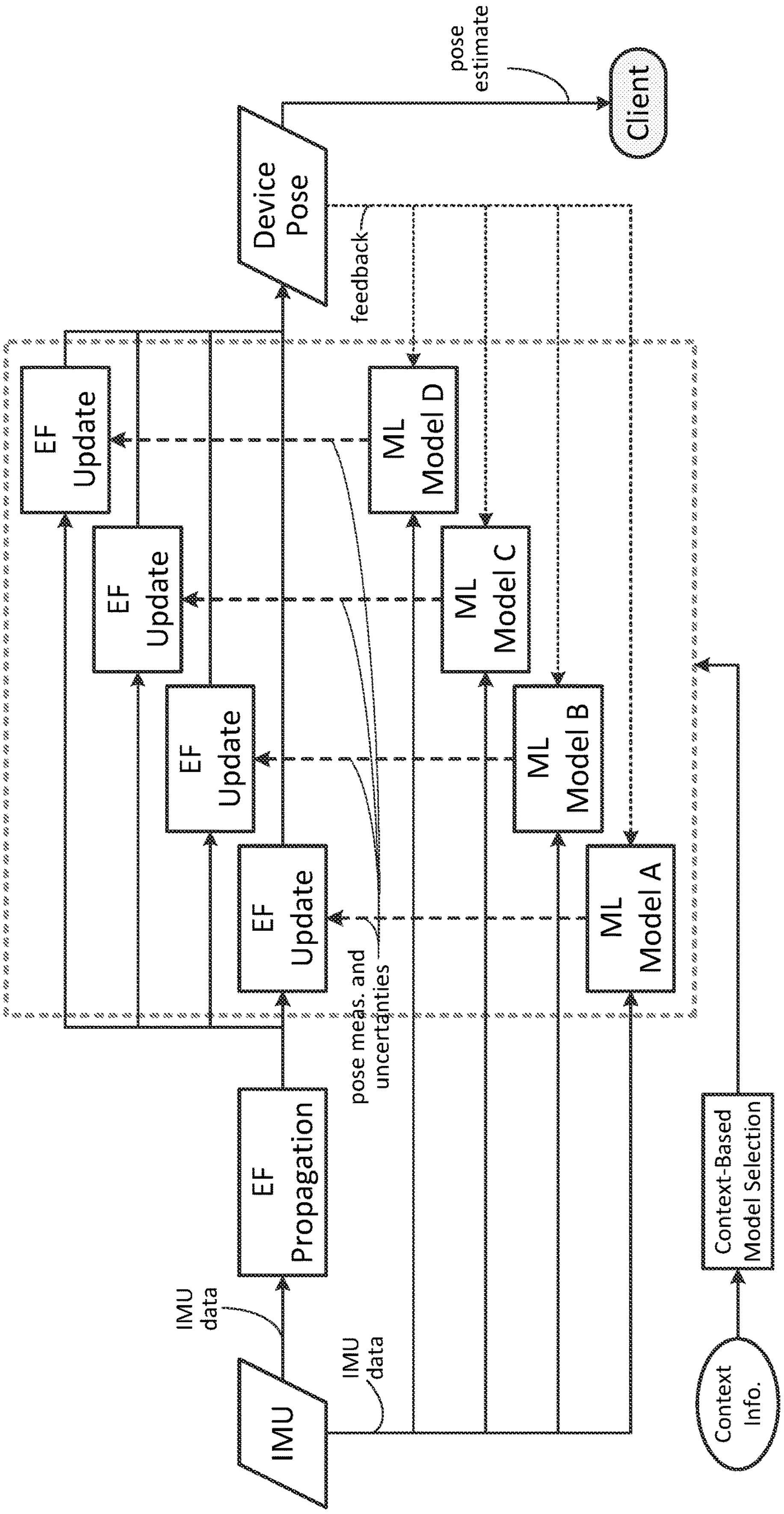
FIG. 5B is a block diagram illustrating a fourth example pose estimation scheme, according to aspects of the disclosure.

FIG. 5B is a block diagram illustrating an example pose estimation scheme 505, according to which the pose estimation scheme 500 of FIG. 5A is extended to include context-based machine-learning model selection. According to pose estimation scheme 505, one or more machine-learning models—in the depicted example, one or more of machine-learning models A, B, C, and D—are selected based on context information characterizing underlying circumstances associated with pose estimation. Such context information can indicate, for example, a type of device for which pose estimation is being conducted, a location of the device (such as a venue within which the device is located or a geographic region within which the device is located), a type of activity in which a user of the device is engaged (such as biking, walking, running, etc.), whether the device is being used indoors or outdoors, whether the device is being worn on a human body, held in a hand, or contained in a pocket, a power state of the device such as a battery charge level, or another aspect of the status of the subject device. By selecting machine-learning models that are suited to the particular pose-tracking scenarios that underlie application of pose estimation scheme 505, as described by the context information, device pose estimates can be generated with enhanced accuracy.

Figure 5C:
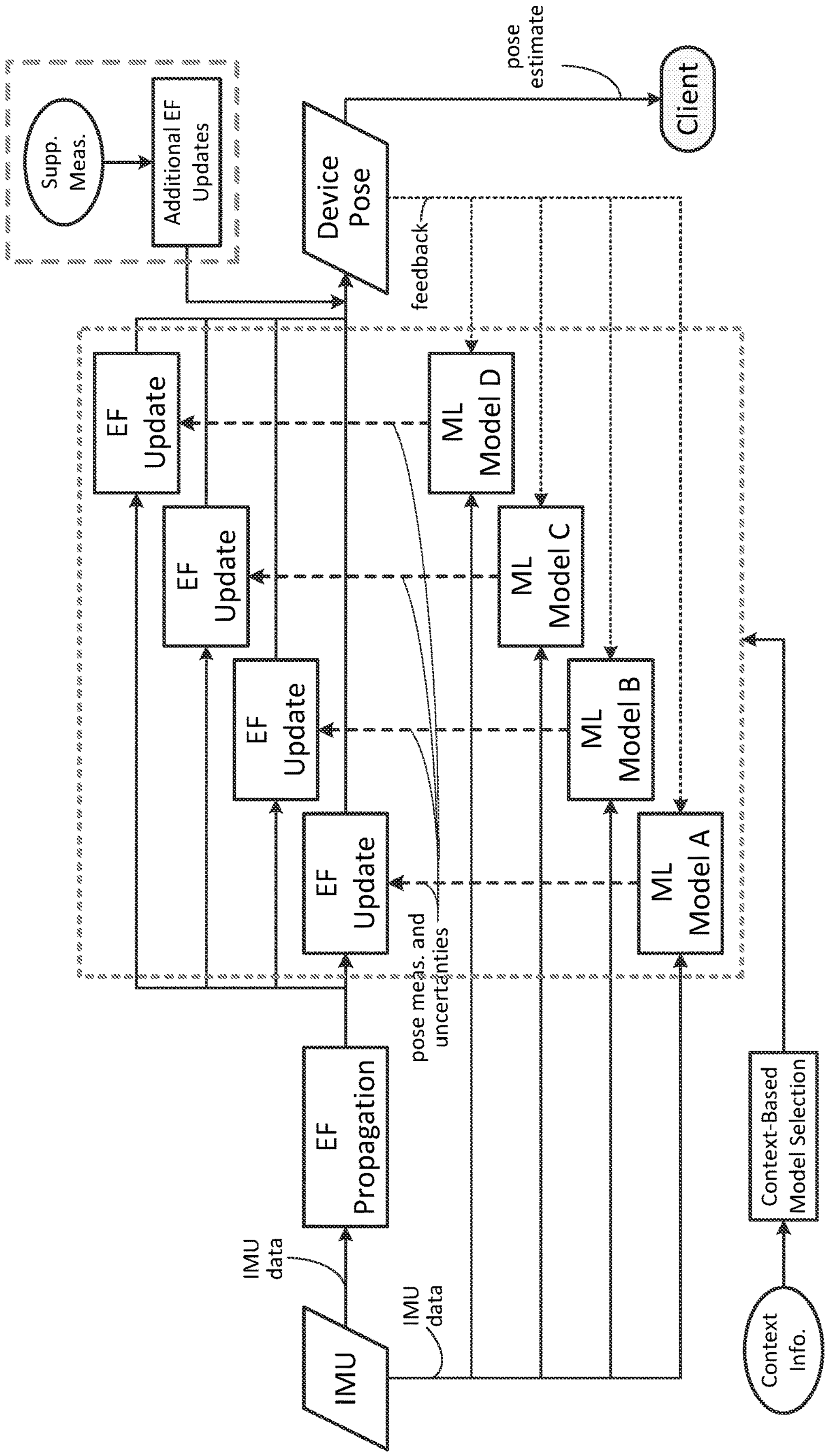
FIG. 5C is a block diagram illustrating a fifth example pose estimation scheme, according to aspects of the disclosure.

FIG. 5C is a block diagram illustrating an example pose estimation scheme 510, according to which the pose estimation scheme 505 of FIG. 5B is extended to make use of supplemental sensing modalities (such as pressure sensing, ultrasound, etc.) in conjunction with device pose estimation.

According to aspects of the disclosure, use of such supplemental sensing modalities can involve conducting pose estimation based in part on information provided by one or more supplemental sensors. In some examples, such one or more supplemental sensors can include one or more of a camera, a radar sensor, a pressure sensor, an ultrasound sensor, and a global navigation satellite system (GNSS) receiver. According to pose estimation scheme 510, as part of estimating a device pose, estimation filter updates are performed based on machine-learning model outputs, and additional estimation filter updates are performed based on supplemental measurements. In some examples, such supplemental measurements can be 6DoF measurements provided by a device external to the subject device. In some other examples, such supplemental measurements can be external or derived measurements of other type(s), such as zero-velocity update, GNSS, pressure, ultrasound measurements, or measurements derived from detected stationarity or non-holonomic constraints. Making use of supplemental sensing modalities in such fashion can improve the accuracy, performance, robustness, and reliability associated with device pose estimation.

Figure 5D:
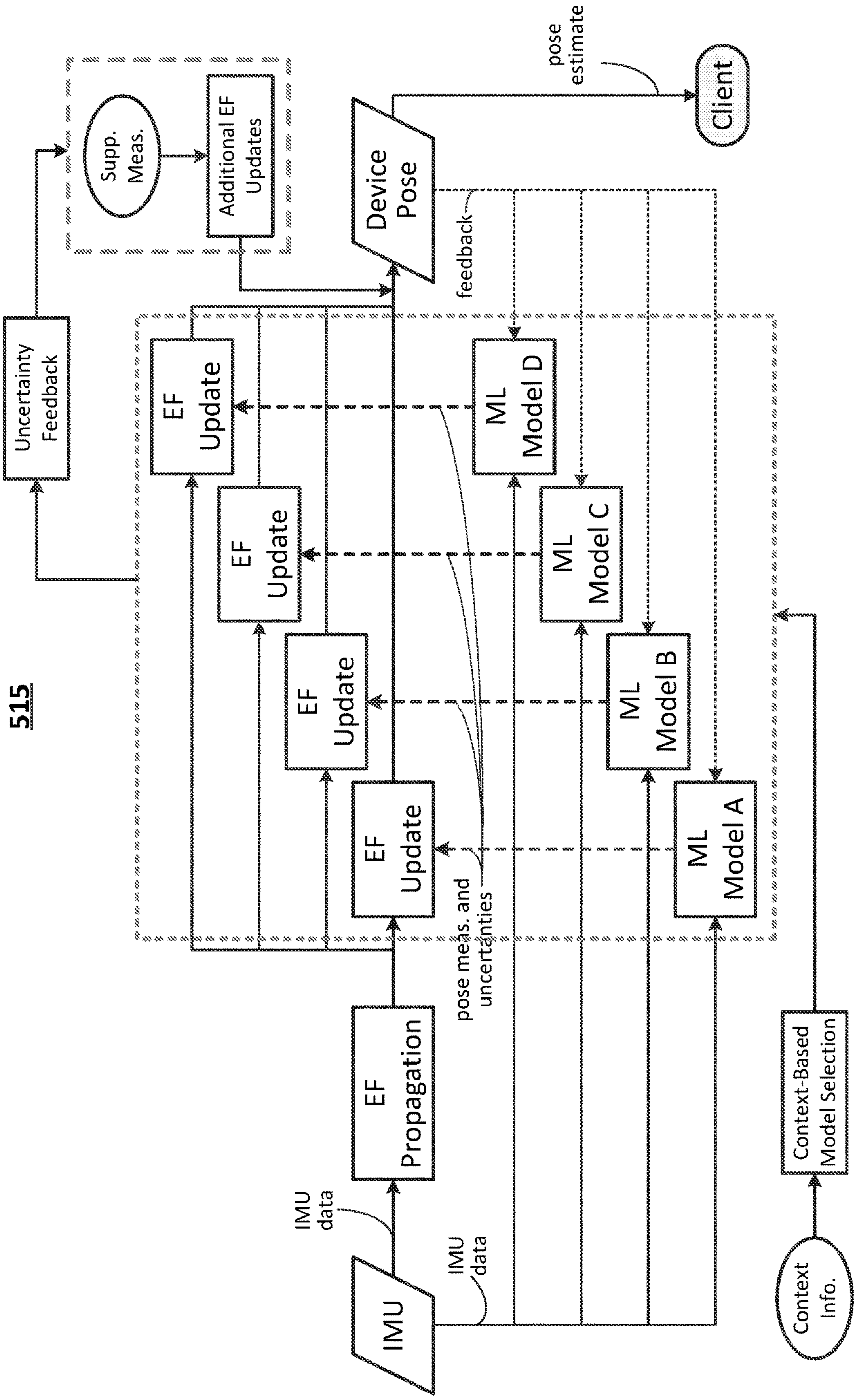
FIG. 5D is a block diagram illustrating a sixth example pose estimation scheme, according to aspects of the disclosure.

FIG. 5D is a block diagram illustrating an example pose estimation scheme 515, according to which the pose estimation scheme 510 of FIG. 5C is extended to support the selective use (or non-use) of supplemental sensing modalities depending on the level of confidence associated with IMU-based device pose estimation. According to pose estimation scheme 515, uncertainty feedback from the set of applied machine-learning models serves as a basis for determining whether or not to acquire and utilize supplemental measurements. When the uncertainty feedback indicates an insufficient level of confidence (for instance, a level of confidence that is less than a threshold), supplemental measurements can be acquired and taken into account (for example, via the application of additional estimation filter updates) in conjunction with device pose estimation. When the uncertainty feedback indicates a sufficiently high level of confidence (for instance, a level of confidence that exceeds a threshold), device pose estimation can be conducted without reference to such supplemental measurements. Such selective use of supplemental sensing modalities can improve the accuracy, performance, robustness, and reliability associated with device pose estimation in cases in which IMU-based pose estimation yields results of less-than-desired quality, while conserving power (by forgoing acquisition of supplemental measurements) in cases in which IMU-based pose estimation yields results of sufficient quality.

Figure 5E:
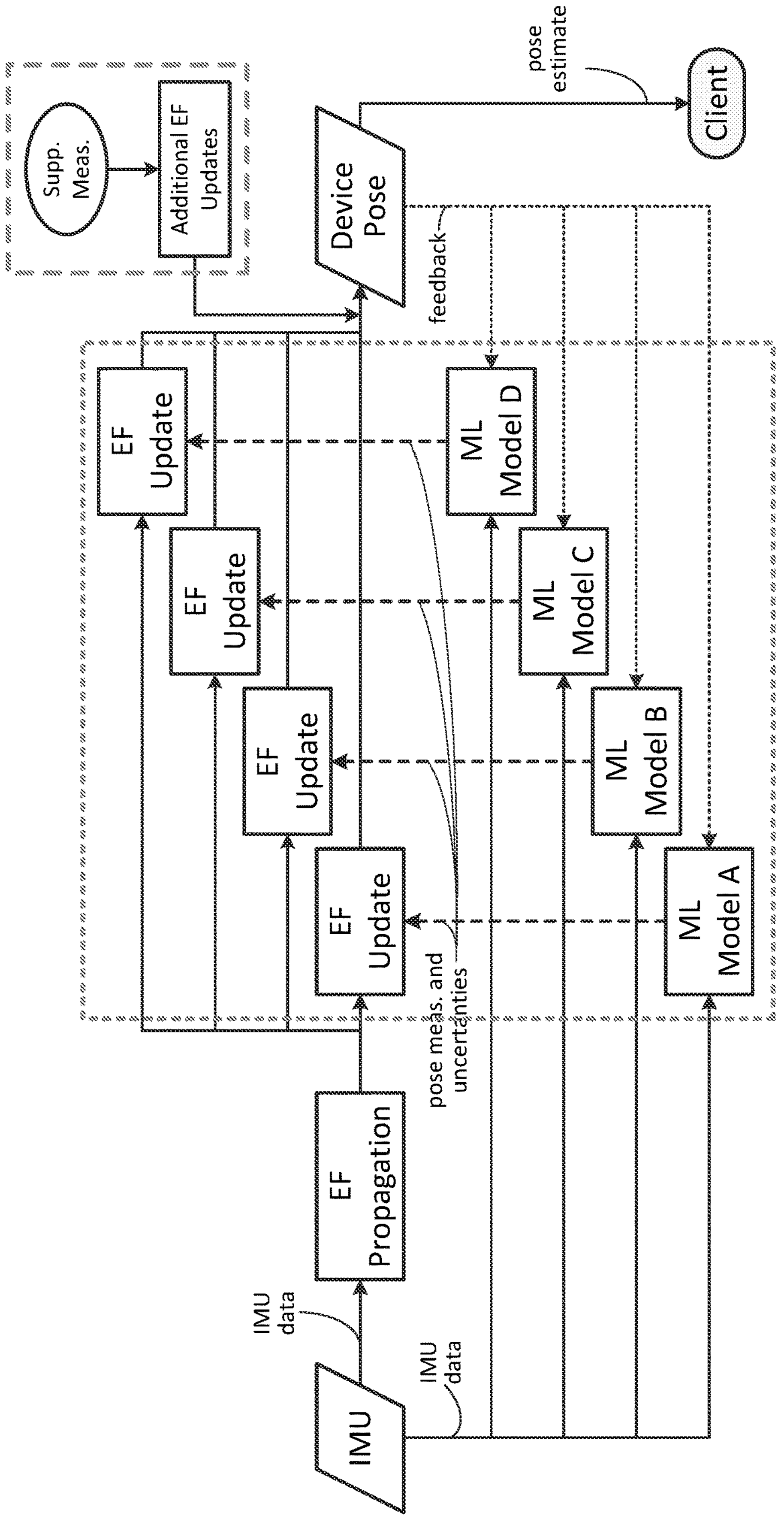
FIG. 5E is a block diagram illustrating a seventh example pose estimation scheme, according to aspects of the disclosure.

FIG. 5E is a block diagram illustrating an example pose estimation scheme 520, according to which the pose estimation scheme 500 of FIG. 5A is extended to make use of supplemental sensing modalities (such as pressure sensing, ultrasound, etc.) in conjunction with device pose estimation. According to aspects of the disclosure, use of such supplemental sensing modalities can involve conducting pose estimation based in part on information provided by one or more supplemental sensors. In some examples, such one or more supplemental sensors can include one or more of a camera, a radar sensor, a pressure sensor, an ultrasound sensor, and a global navigation satellite system (GNSS) receiver. According to pose estimation scheme 520, as part of estimating a device pose, estimation filter updates are performed based on machine-learning model outputs, and additional estimation filter updates are performed based on supplemental measurements. In some examples, such supplemental measurements can be 6DoF measurements provided by a device external to the subject device. In some other examples, such supplemental measurements can be external or derived measurements of other type(s), such as zero-velocity update, GNSS, pressure, ultrasound measurements, or measurements derived from detected stationarity or non-holonomic constraints. Making use of supplemental sensing modalities in such fashion can improve the accuracy, performance, robustness, and reliability associated with device pose estimation.

Figure 5F:
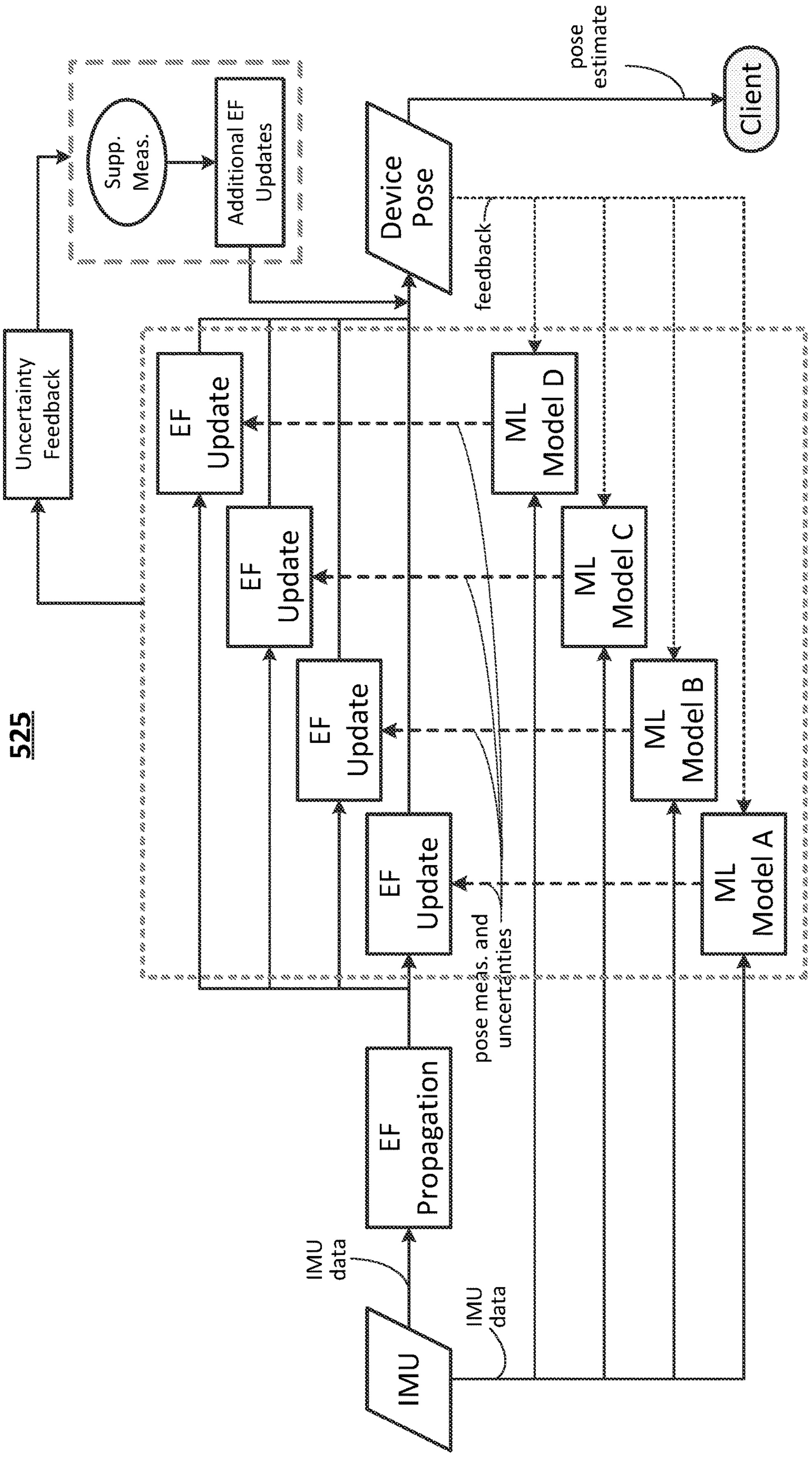
FIG. 5F is a block diagram illustrating a eighth example pose estimation scheme, according to aspects of the disclosure.

FIG. 5F is a block diagram illustrating an example pose estimation scheme 525, according to which the pose estimation scheme 515 of FIG. 5D is extended to support the selective use (or non-use) of supplemental sensing modalities depending on the level of confidence associated with IMU-based device pose estimation. According to pose estimation scheme 525, uncertainty feedback from the set of applied machine-learning models serves as a basis for determining whether or not to acquire and utilize supplemental measurements. When the uncertainty feedback indicates an insufficient level of confidence (for instance, a level of confidence that is less than a threshold), supplemental measurements can be acquired and taken into account (for example, via the application of additional estimation filter updates) in conjunction with device pose estimation. When the uncertainty feedback indicates a sufficiently high level of confidence (for instance, a level of confidence that exceeds a threshold), device pose estimation can be conducted without reference to such supplemental measurements. Such selective use of supplemental sensing modalities can improve the accuracy, performance, robustness, and reliability associated with device pose estimation in cases in which IMU-based pose estimation yields results of less-than-desired quality, while conserving power (by forgoing acquisition of supplemental measurements) in cases in which IMU-based pose estimation yields results of sufficient quality.

Figure 6:
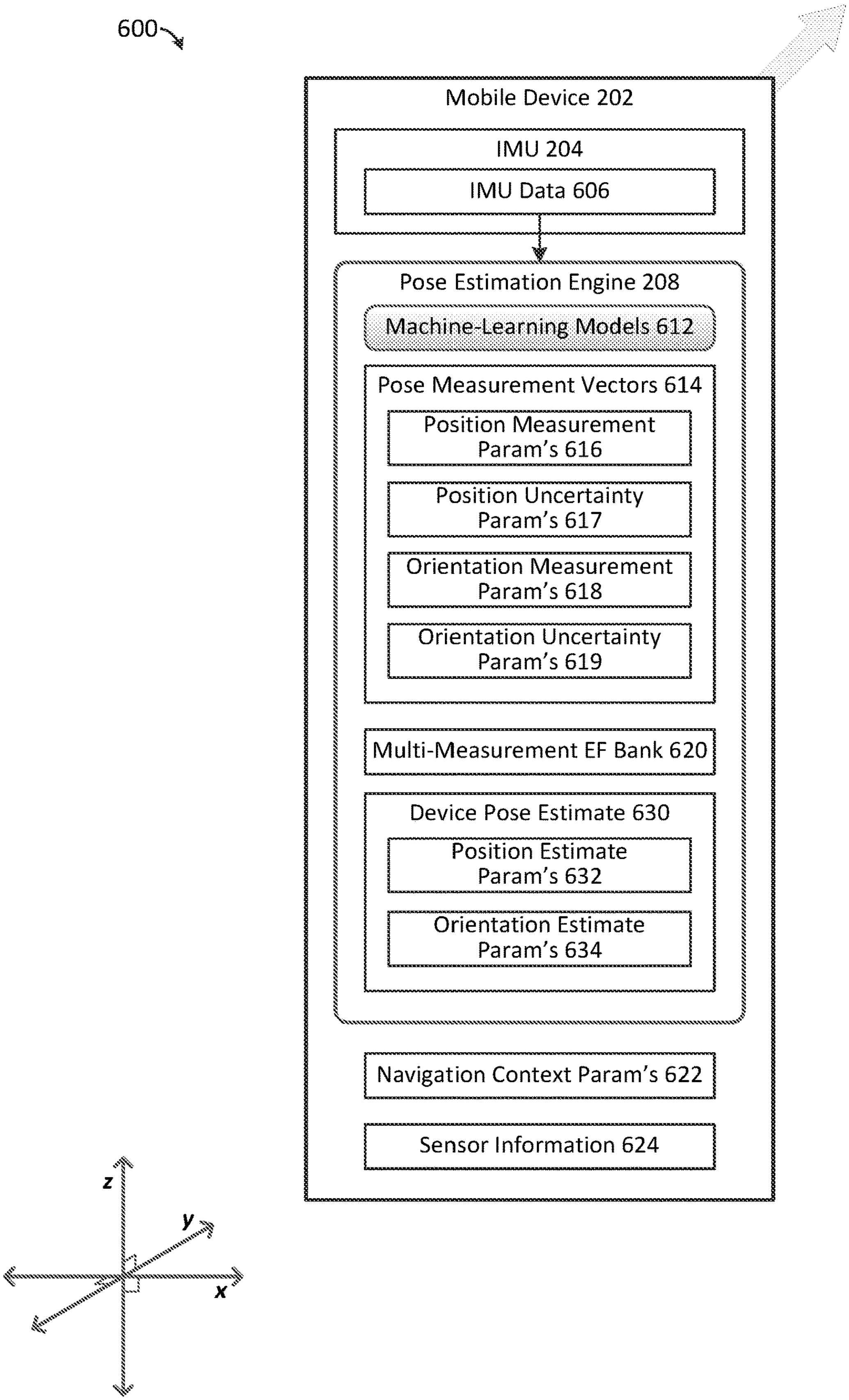
FIG. 6 is a block diagram illustrating a second example operating environment, according to aspects of the disclosure.

FIG. 6 is a block diagram illustrating an example operating environment 600 in which mobile device 202 may implement techniques for inertial navigation aided with multi-interval pose measurements, according to aspects of the disclosure. Operating environment 600 may be representative of some examples in which pose estimation engine 208 conducts pose estimation according to any of pose estimation schemes 500, 505, 510, and 515 of FIGS. 5A, 5B, 5C, and 5D.

In operating environment 600, based on IMU data 606 obtained from IMU 204, pose estimation engine 208 can generate a plurality of pose measurement vectors 614. Each pose measurement vector 614 can generally describe one or more pose characteristics of mobile device 202, such as one or more of a position of mobile device 202, an orientation of mobile device 202, a linear velocity of mobile device 202, and an angular velocity of mobile device 202. Each pose measurement vector 614 can generally describe such pose characteristic(s) with respect to one or more coordinate dimensions, such as one or more of those defined by the x, y, and z axes in FIG. 6. In some examples, pose measurement vectors 614 can describe current pose characteristics of mobile device 202, such as current positions, orientations, and/or linear or angular velocities of mobile device 202. In other examples, pose measurement vectors 614 can be delta measurements that indicate changes in pose characteristics of mobile device 202 over intervals in time, such as linear or angular displacements of mobile device 202, differences in linear or angular velocities of mobile device 202, or the like. In some examples, some or all of pose measurement vectors 614 can describe pose characteristic(s) of mobile device 202 with respect to three dimensions (such as the x, y, and z dimensions shown in FIG. 6). In some examples, some or all of pose measurement vectors 614 can describe pose characteristic(s) of mobile device 202 with respect to one or two dimensions (such as one or two of the x, y, and z dimensions shown in FIG. 6).

According to aspects of the disclosure, each of the plurality of pose measurement vectors 614 can be generated according to a respective one of a plurality of machine-learning models 612 (such as machine-learning models A, B, C, and D of FIGS. 5A, 5B, 5C, and 5D, for example). In some examples, each machine-learning model 612 can be used to generate pose measurement vectors associated with a respective one of multiple motion classes. In some examples, each of the multiple motion classes can correspond to a different respective time interval value. As reflected in FIG. 6, the pose measurement vectors 614 can comprise measurement parameters (which can include one or both of position measurement parameters 616 and orientation measurement parameters 618), and corresponding uncertainty parameters (which can include one or both of position uncertainty parameters 617 and orientation uncertainty parameters 619).

In some examples, the position measurement parameters 616 can indicate positions according to a three-dimensional coordinate system, such as that defined by the x, y, and z axes in FIG. 6. In some other examples, the position measurement parameters 616 can indicate changes in position according to the three-dimensional coordinate system. In some examples, the orientation measurement parameters 618 can indicate orientations according to the three-dimensional coordinate system. In some other examples, the orientation measurement parameters 618 can indicate changes in orientation according to the three dimensional coordinate system.

In some examples, each pose measurement vector 614 can include one or more measurement parameters, including a respective measurement parameter for each of one or more dimensions. In some examples, for each of the one or more dimensions, the one or more measurement parameters can include a respective position measurement parameter 616, a respective orientation measurement parameter 618, or a combination of both. In some examples, for each of the one or more dimensions, the one or more uncertainty parameters can include a respective position uncertainty parameter 617, a respective orientation uncertainty parameter 619, or a combination of both.

In some examples, each pose measurement vector 614 can include three position measurement parameters 616, including a respective position measurement parameter 616 for each of three dimensions (such as the x, y, and z dimensions in FIG. 6). In some examples, each pose measurement vector 614 can include three orientation measurement parameters 618, including a respective orientation measurement parameter 618 for each of the three dimensions. In some examples, each pose measurement vector 614 can include six uncertainty parameters, which can include three position uncertainty parameters 617 comprising respective position uncertainty parameters 617 for each of three position measurement parameters 616, and three orientation uncertainty parameters 619 comprising respective orientation uncertainty parameters 619 for each of three orientation measurement parameters 618.

Based on IMU data 606 and the plurality of pose measurement vectors 614, pose estimation engine 208 can generate a device pose estimate 630, which can comprise one or more position estimate parameters 632, one or more orientation estimate parameters 634, or a combination of both. In some examples, the device pose estimate can comprise, for each of one or more dimensions, a respective position estimate parameter 632, a respective orientation estimate parameter 634, or a combination of both. In some examples, the device pose estimate 630 can comprise three position estimate parameters 632, including a respective position estimate parameter 632 for each of three dimensions, and can comprise three orientation estimate parameters 634, including a respective orientation estimate parameters 634 for each of the three dimensions.

In some examples, for each of one or more dimensions, pose estimation engine 208 can determine a respective position estimate parameter 632 for that dimension by weighting respective position measurement parameters 616 for that dimension among position measurement parameters 616 of the plurality of pose measurement vectors 614 according to respective position uncertainty parameters 617 for that dimension among position uncertainty parameters 617 of the plurality of pose measurement vectors 614.

In some examples, for each of the one or more dimensions, pose estimation engine 208 can additionally or alternatively determine a respective orientation estimate parameter 634 for that dimension by weighting respective orientation measurement parameters 618 for that dimension among orientation measurement parameters 618 of the plurality of pose measurement vectors 614 according to respective orientation uncertainty parameters 619 for that dimension among orientation uncertainty parameters 619 of the plurality of pose measurement vectors 614.

According to aspects of the disclosure, pose estimation engine 208 can determine the device pose estimate 630 based on an estimated system state that pose estimation engine 208 tracks and updates using a multi-measurement estimation filter bank 620. In some examples, the multi-measurement estimation filter bank can be realized via the implementation of estimation filtering according to measurement and update equations that are modified to use multiple sets of pose measurements and uncertainties as inputs. In some examples, the multi-measurement estimation filter bank can be a Kalman filter bank. In other examples, in lieu of—or in addition to—Kalman filters (KFs), the multi-measurement estimation filter bank can include estimation filters of one or more other types, such as extended KFs (EKFs), unscented KFs, cubature KFs, alpha-beta filters, Gaussian-sum filters, interactive multiple model filters, particle filters, or a combination thereof.

In some examples, pose estimation engine 208 can update a state of the multi-measurement estimation filter bank 620 based on the IMU data 606 and the plurality of pose measurement vectors 614, and can determine the device pose estimate 630 based on the updated state of the multi-measurement estimation filter bank 620. In some examples, the multi-measurement estimation filter bank 620 can be implemented as a state buffer, and pose estimation engine 208 can update the state of the multi-measurement estimation filter bank 620 by performing, for each of the plurality of pose measurement vectors 614, a respective update of the state buffer.

In some examples, one or more of the machine-learning models 612 according to which pose estimation engine 208 generates the plurality of pose measurement vectors 614 can be selected based on one or more navigation context parameters 622. The one or more navigation context parameters 622 can generally comprise information characterizing underlying circumstances under which pose estimation is being conducted. In some examples, the one or more navigation context parameters 622 can be included among context information that serves as a basis for context-based model selection according to pose estimation scheme 505 of FIG. 5B. In some examples, the one or more navigation context parameters 622 can include a device type parameter that indicates a type of device for which pose estimation is being conducted. In some examples, the one or more navigation context parameters 622 can include one or more device status parameters, any given one of which can describe a status of the subject device, such as whether the device is being worn on a human body, held in a hand, or contained in a pocket, a power state of the device such as a battery charge level, or another aspect of the status of the subject device. In some examples, the one or more navigation context parameters 622 can include one or more device usage regime parameters, any given one of which can describe a usage location or usage scenario of the device, such as whether the device is being used indoors or outdoors, or a type of activity in which a user of the device is engaged (such as biking, walking, running, etc.).

In some examples, based on the context of pose estimation, as characterized by one or more navigation context parameters 622, the uncertainty parameters (such as position uncertainty parameters 617 and/or orientation uncertainty parameters 619) associated with one or more machine-learning models 612 can be scaled (for instance, increased or decreased). The pose estimates produced by those one or more machine-learning models 612 can then be weighted according to their scaled uncertainties.

In some examples, pose estimation engine 208 can obtain sensor information 624 from one or more sensors (not shown in FIG. 6), and can determine device pose estimate 630 based on IMU data 606, pose measurement vectors 614, and the sensor information 624. In some information, sensor information 624 can be included among measurements associated with supplemental sensing modalities that serve as a basis for additional estimation filter updates in conjunction with pose estimation according to pose estimation scheme 510 of FIG. 5C. In some examples, reference to sensor information 624 associated with supplemental sensing modalities can allow pose estimation engine 208 to determine device pose estimate 630 with greater accuracy. In some examples, the sensor(s) from which pose estimation engine 208 obtains sensor information 624 can include one or more of a camera, a radar sensor, a pressure sensor, an ultrasound sensor, and a global navigation satellite system (GNSS) receiver.

In some examples, pose estimation engine 208 can determine or estimate a confidence level associated with device pose estimate 630 based on uncertainty parameters comprised in pose measurement vectors 614, such as position uncertainty parameters 617 and or orientation uncertainty parameters 619. In some examples, the confidence level can be included among uncertainty feedback that serves as a basis for determining whether or not to acquire and utilize supplemental measurements in conjunction with pose estimation according to pose estimation scheme 520 of FIG. 5D. In some examples, if the confidence level is low (in that it is below a threshold value, for instance), pose estimation engine 208 can select one or more types of supplemental measurements for use as inputs in determining device pose estimate 630, and can obtain sensor information 624 based on the type(s) of supplemental measurements that it has selected. In some examples, if the confidence level is high (in that it is above a threshold value, for instance), pose estimation engine 208 can determine device pose estimate 630 without reference to supplemental measurements.

Figure 7:
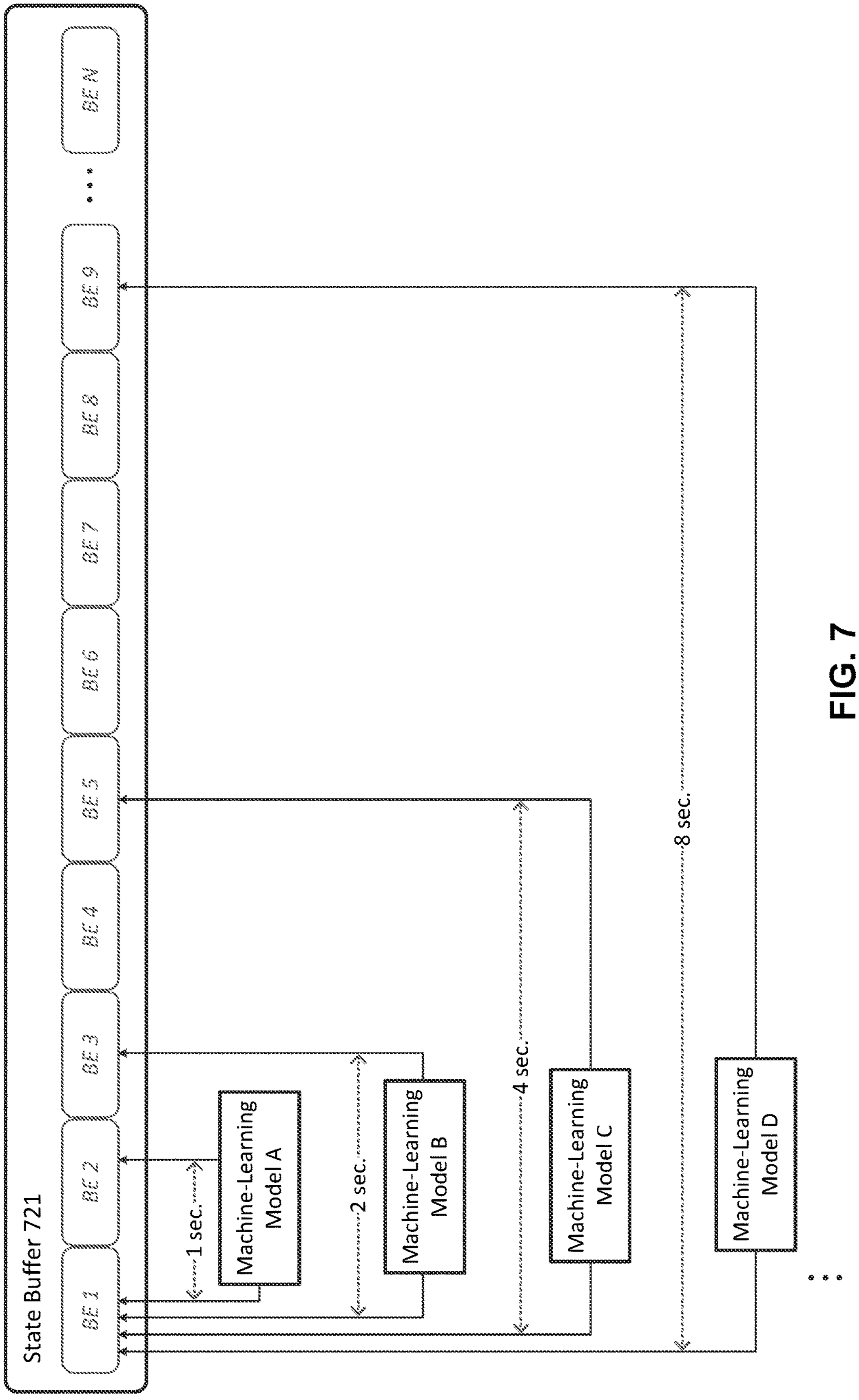
FIG. 7 is a diagram illustrating an example filter bank update procedure, according to aspects of the disclosure.

FIG. 7 is a diagram illustrating an example filter bank update procedure 700, according to aspects of the disclosure. According to filter bank update procedure 700, a multi-measurement estimation filter bank can be implemented using an N-element state buffer 721. In some examples, the multi-measurement estimation filter bank can be a Kalman filter bank. In other examples, in lieu of—or in addition to—Kalman filters (KFs), the multi-measurement estimation filter bank can include estimation filters of one or more other types, such as extended KFs (EKFs), unscented KFs, cubature KFs, alpha-beta filters, Gaussian-sum filters, interactive multiple model filters, particle filters, or a combination thereof. The state buffer 721 comprises N buffer elements, and each buffer element (BE) may include value of different state parameters, associated uncertainties as well as any additional useful information such as device and/or sensor temperature, sensor configuration parameters (e.g., sampling frequency, bias, noise etc.) etc. as recorded at that time. Each buffer element can correspond to a unique time 't' and subsequent buffer elements can be recorded at increasing values of time. According to aspects of the disclosure, state buffer 721 can be used to accommodate potential delays in receipt of pose measurements. If receipt of a pose measurement for a time $t_1$ is delayed such that the pose measurement is not received until a subsequent time $t_2$, a state value for the time $t_1$ can be read from the state buffer 721 and updated based on the received pose measurement for the time $t_1$. In some examples, state buffer 721 can be used to accommodate delta pose measurements. In some examples, respective states corresponding to the beginning and ending times associated with a delta pose measurement can be retrieved from respective buffer elements of state buffer 721 and updated based on the delta pose measurement.

Updates to the multi-measurement estimation filter bank can be conducted by modifying buffer elements of the state buffer 721 according to outputs of multiple machine-learning models, including machine-learning models A, B, C, and D. The scope (in terms of buffer elements) of modifications to the state buffer 721 involved in an update based on outputs of a given machine-learning model corresponds to the time interval value associated with that machine-learning model. Updates based on outputs of machine-learning model A, which has an associated time interval value of 1 second, involve modifications spanning from buffer element (BE) 1 to buffer element 2, and thus a scope of one buffer element. Similarly, updates based on outputs of machine-learning models B, C, and D, which have respective associated time interval values of 2, 4, and 8 seconds, involve modifications having respective scopes of two, four, and 8 buffer elements. In some examples, any given pose measurement (which can include position and/or orientation components in one or multiple dimensions) can take the form of a current pose measurement for a specific buffer element in state buffer 721. In some other examples, any given pose measurement can take the form of a delta pose change from one buffer element of state buffer 721 to another.

Figure 8:
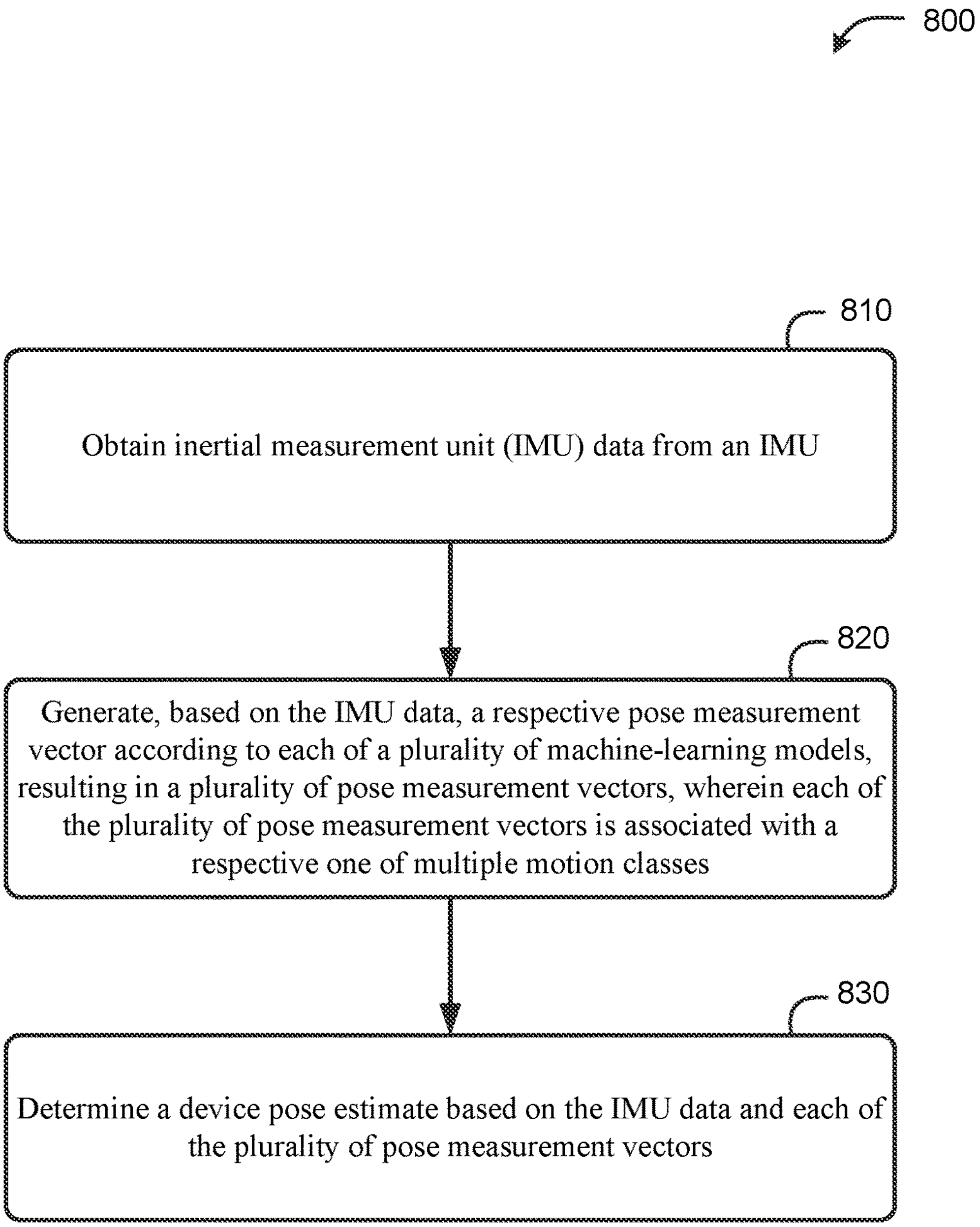
FIG. 8 is a block diagram illustrating an example inertial navigation method, according to aspects of the disclosure.
Figure 9:
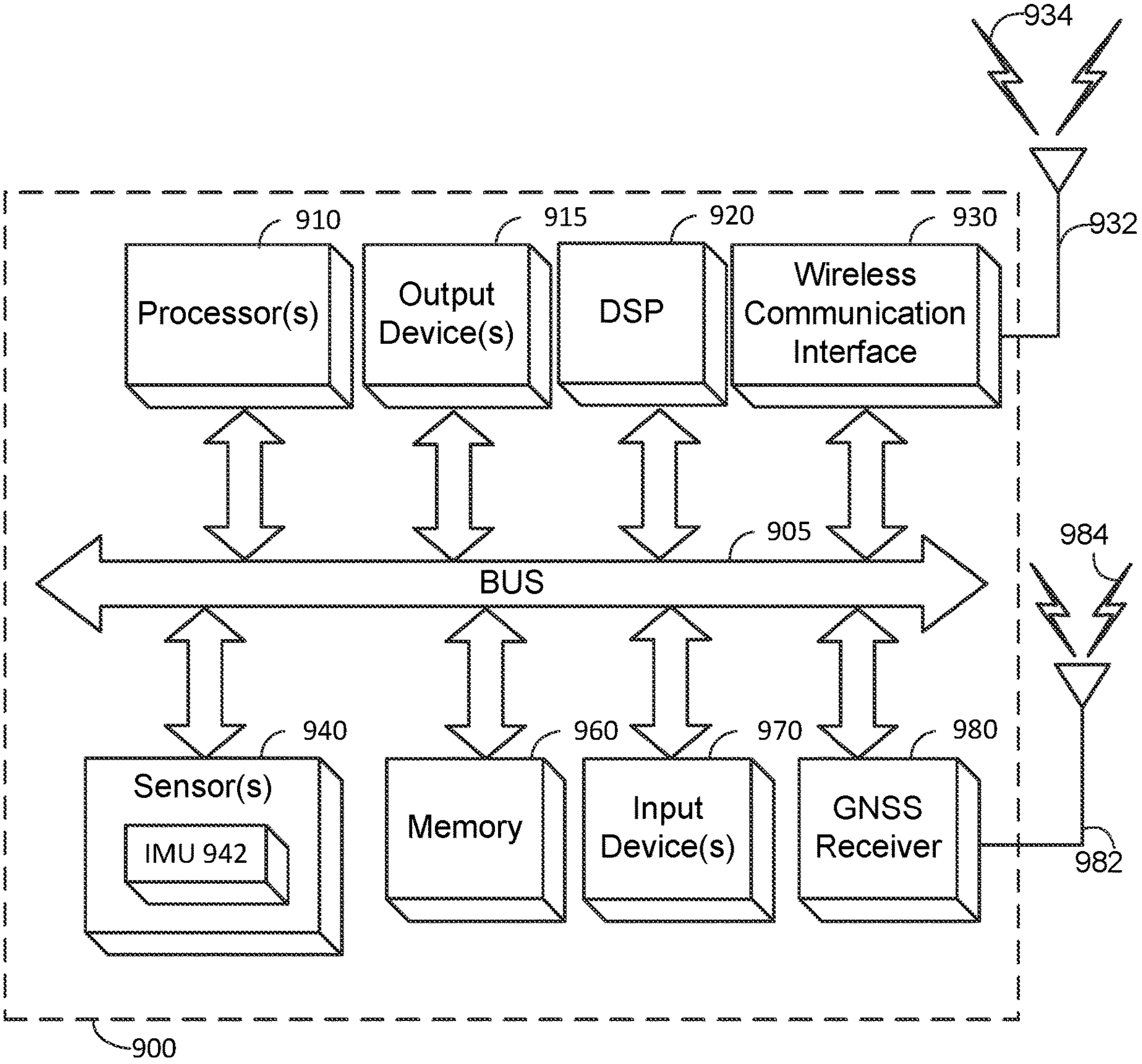
FIG. 9 is a block diagram of an embodiment of a mobile device, which can be utilized in embodiments as described herein.

FIG. 8 is a block diagram illustrating an example inertial navigation method, according to aspects of the disclosure. According to aspects of the disclosure, means for performing the functionality illustrated in one or more of the blocks shown in FIG. 8 may be performed by hardware and/or software components of a mobile device. Example components of a mobile device are illustrated in FIG. 9, which is described in more detail below. In some examples, mobile device 202 may perform the functionality illustrated in one or more of the blocks shown in FIG. 8 in operating environment 600 of FIG. 6.

At block 810, the functionality comprises obtaining IMU data from an IMU. For example, in operating environment 600 of FIG. 6, pose estimation engine 208 can obtain IMU data 606 from IMU 204. Means for performing functionality at block 810 may comprise a bus 905, processor(s) 910, digital signal processor (DSP) 920, wireless communication interface 930, IMU 942, memory 960, and/or other components of a mobile device, as illustrated in FIG. 9.

At block 820, the functionality comprises generating, based on the IMU data, a respective pose measurement vector according to each of a plurality of machine-learning models, resulting in a plurality of pose measurement vectors, where each of the plurality of pose measurement vectors is associated with a respective one of multiple motion classes. For example, in operating environment 600 of FIG. 6, pose estimation engine 208 can generate, based on IMU data 606, a respective pose measurement vector 614 according to each of a plurality of machine-learning models 612, resulting in a plurality of pose measurement vectors 614, and each of the plurality of pose measurement vectors 614 can be associated with a respective one of multiple motion classes. In some examples, each of the multiple motion classes can correspond to a different respective time interval value. Means for performing functionality at block 820 may comprise a bus 905, processor(s) 910, DSP 920, wireless communication interface 930, IMU 942, memory 960, and/or other components of a mobile device, as illustrated in FIG. 9.

In some examples, each pose measurement vector of the plurality of pose measurement vectors can include three position measurement parameters, including a respective position measurement parameter for each of three dimensions, and three orientation measurement parameters, including a respective orientation measurement parameter for each of the three dimensions. For example, in operating environment 600 of FIG. 6, each of pose measurement vectors 614 can include three position measurement parameters 616, including a respective position measurement parameter 616 for each of the x, y, and z dimensions, and can include three orientation measurement parameters 618, including a respective orientation measurement parameter 618 for each of the x, y, and z dimensions. In some examples, the position measurement parameters can indicate changes in position, such as translations. In some examples, the orientation measurement parameters can indicate changes in orientation, such as rotations.

In some examples, each pose measurement vector of the plurality of pose measurement vectors can comprise six uncertainty parameters, which can include three position uncertainty parameters, including a respective position uncertainty parameter for each of the three position measurement parameters, and three orientation uncertainty parameters, including a respective orientation uncertainty parameter for each of the three orientation measurement parameters. For example, in operating environment 600 of FIG. 6, each of pose measurement vectors 614 can comprise six uncertainty parameters, including three position uncertainty parameters 617 and three orientation uncertainty parameters 619.

In some examples, at least one of the plurality of machine-learning models can be selected based on one or more navigation context parameters. For example, in operating environment 600 of FIG. 6, pose estimation engine 208 can select at least one of machine-learning models 612 based on one or more navigation context parameters 622. In some examples, the one or more navigation context parameters can include one or more of a device type parameter, a device status parameter, and a device usage regime parameter.

At block 830, the functionality comprises determining a device pose estimate based on the IMU data and each of the plurality of pose measurement vectors. For example, in operating environment 600 of FIG. 6, pose estimation engine 208 can determine device pose estimate 630 based on IMU data 606 and each of the plurality of pose measurement vectors 614. Means for performing functionality at block 830 may comprise a bus 905, processor(s) 910, DSP 920, wireless communication interface 930, IMU 942, memory 960, and/or other components of a mobile device, as illustrated in FIG. 9.

In some examples, a state of a multi-measurement estimation filter bank can be updated based on the IMU data and each of the plurality of pose measurement vectors, and the device pose estimate can be determined based on the updated state of the multi-measurement estimation filter bank. For example, in operating environment 600 of FIG. 6, pose estimation engine 208 can update a state of multi-measurement estimation filter bank 620 based on IMU data 606 and each of the plurality of pose measurement vectors 614, and can determine the device pose estimate 630 based on the updated state of the multi-measurement estimation filter bank 620. In some examples, the multi-measurement estimation filter bank can be a Kalman filter bank. In other examples, in lieu of—or in addition to—Kalman filters (KFs), the multi-measurement estimation filter bank can include estimation filters of one or more other types, such as extended KFs (EKFs), unscented KFs, cubature KFs, alpha-beta filters, Gaussian-sum filters, interactive multiple model filters, particle filters, or a combination thereof.

In some examples, the multi-measurement estimation filter bank can be implemented as a state buffer, and updating the state of the multi-measurement estimation filter bank based on the IMU data and each of the plurality of pose measurement vectors can include performing, for each of the plurality of pose measurement vectors, a respective update of the state buffer. For example, updating the state of the multi-measurement estimation filter bank 620 based on the IMU data 606 and each of the plurality of pose measurement vectors 614 in operating environment 600 of FIG. 6 can include performing a respective update of state buffer 721 of FIG. 7 for each of the plurality of pose measurement vectors 614.

In some examples, the device pose estimate can comprise three position estimate parameters, including a respective position estimate parameter for each of three dimensions, and three orientation estimate parameters, including a respective orientation estimate parameter for each of the three dimensions. For example, in operating environment 600 of FIG. 6, device pose estimate 630 can comprise three position estimate parameters 632, including a respective position estimate parameter 632 for each of the x, y, and z dimensions, and can comprise three orientation estimate parameters 634, including a respective orientation estimate parameter 634 for each of the x, y, and z dimensions.

In some examples, for each of the three dimensions, the respective position estimate parameter for that dimension can be determined by weighting the respective position measurement parameters for that dimension among the position measurement parameters of the plurality of pose measurement vectors according to the respective position uncertainty parameters for that dimension among the position uncertainty parameters of the plurality of pose measurement vectors. For example, for each of the x, y, and z dimensions in operating environment 600 of FIG. 6, pose estimation engine 208 can determine the respective position estimate parameter 632 for that dimension by weighting the respective position measurement parameters 616 for that dimension among the position measurement parameters 616 of the plurality of pose measurement vectors 614 according to the respective position uncertainty parameters 617 for that dimension among the position uncertainty parameters 617 of the plurality of pose measurement vectors 614.

In some examples, for each of the three dimensions, the respective orientation estimate parameter for that dimension can be determined by weighting the respective orientation measurement parameters for that dimension among the orientation measurement parameters of the plurality of pose measurement vectors according to the respective orientation uncertainty parameters for that dimension among the orientation uncertainty parameters of the plurality of pose measurement vectors. For example, for each of the x, y, and z dimensions in operating environment 600 of FIG. 6, pose estimation engine 208 can determine the respective orientation estimate parameter 634 for that dimension by weighting the respective orientation measurement parameters 618 for that dimension among the orientation measurement parameters 618 of the plurality of pose measurement vectors 614 according to the respective orientation uncertainty parameters 619 for that dimension among the orientation uncertainty parameters 619 of the plurality of pose measurement vectors 614.

In some examples, sensor information can be obtained from one or more sensors, and the device pose estimate can be determined at block 830 based on the IMU data, each of the plurality of pose measurement vectors, and the sensor information. For example, in operating environment 600 of FIG. 6, pose estimation engine 208 can obtain sensor information 624 from one or more sensors (not shown in FIG. 6), and can determine the device pose estimate 630 based on the IMU data 606, each of the plurality of pose measurement vectors 614, and the sensor information 624. In some examples, the one or more sensors can include one or more of a camera, a radar sensor, a pressure sensor, an ultrasound sensor, and a global navigation satellite system (GNSS) receiver.

In some examples, based on uncertainty parameters of the plurality of pose measurement vectors, one or more types of supplemental measurements can be selected as inputs for determining the device pose estimate, and the sensor information can be obtained from the one or more sensors based on the one or more selected types of supplemental measurements. For example, in operating environment 600 of FIG. 6, based on position uncertainty parameters 617 and/or orientation uncertainty parameters 619 of the plurality of pose measurement vectors 614, pose estimation engine 208 can select one or more types of supplemental measurements as inputs for determining the device pose estimate 630, and can obtain the sensor information 624 based on the one or more selected types of supplemental measurements.

FIG. 9 is a block diagram of an embodiment of a mobile device 900, which can be utilized as described herein above (e.g., in association with FIGS. 1-8). For example, the mobile device 900 be used to implement one or both of UE 105 of FIG. 1 and mobile device 202 of FIG. 2. In some examples, mobile device 900 can perform one or more operations associated with one or more of pose estimation scheme 300 of FIG. 3, pose estimation scheme 400 of FIG. 4, pose estimation scheme 500 of FIG. 5A, pose estimation scheme 505 of FIG. 5B, pose estimation scheme 510 of FIG. 5C, pose estimation scheme 515 of FIG. 5D, filter bank update procedure 700 of FIG. 7, and inertial navigation method 800 of FIG. 8. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 9.

The mobile device 900 is shown comprising hardware elements that can be electrically coupled via a bus 905 (or may otherwise be in communication, as appropriate). The hardware elements may include a processor(s) 910 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 910 may comprise one or more processing units, which may be housed in a single integrated circuit (IC) or multiple ICs. As shown in FIG. 9, some embodiments may have a separate DSP 920, depending on desired functionality. Location determination and/or other determinations based on wireless communication may be provided in the processor(s) 910 and/or wireless communication interface 930 (discussed below). The mobile device 900 also can include one or more input devices 970, which can include without limitation one or more keyboards, touch screens, touch pads, microphones, buttons, dials, switches, and/or the like; and one or more output devices 915, which can include without limitation one or more displays (e.g., touch screens), light emitting diodes (LEDs), speakers, and/or the like.

The mobile device 900 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 900 to communicate with other devices as described in the embodiments above. The wireless communication interface 930 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 932 that send and/or receive wireless signals 934. According to some embodiments, the wireless communication antenna(s) 932 may comprise a plurality of discrete antennas, antenna arrays, or any combination thereof. The antenna(s) 932 may be capable of transmitting and receiving wireless signals using beams (e.g., Tx beams and Rx beams). Beam formation may be performed using digital and/or analog beam formation techniques, with respective digital and/or analog circuitry. The wireless communication interface 930 may include such circuitry.

Depending on desired functionality, the wireless communication interface 930 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device

900 may communicate with different data networks that may comprise various network types. For example, a WWAN may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR. LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 900 can further include sensor(s) 940. Sensor(s) 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile device 900 may also include a Global Navigation Satellite System (GNSS) receiver 980 capable of receiving signals 984 from one or more GNSS satellites using an antenna 982 (which could be the same as antenna 932). Positioning based on GNSS signal measurement can be utilized to complement and/or incorporate the techniques described herein. The GNSS receiver 980 can extract a position of the mobile device 900, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 980 is illustrated in FIG. 9 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 910, DSP 920, and/or a processor within the wireless communication interface 930 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), particle filter, or the like. The positioning engine may also be executed by one or more processors, such as processor(s) 910 or DSP 920.

The mobile device 900 may further include and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the mobile device 900 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the mobile device 900 (and/or processor(s) 910 or DSP 920 within mobile device 900). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for inertial navigation, including obtaining inertial measurement unit (IMU) data from an IMU, generating, based on the IMU data, a respective pose measurement vector according to each of a plurality of machine-learning models, resulting in a plurality of pose measurement vectors, where each of the plurality of pose measurement vectors is associated with a respective one of multiple motion classes, and determining a device pose estimate based on the IMU data and the plurality of pose measurement vectors.

Clause 2. The method of clause 1, including updating a state of a multi-measurement estimation filter bank based on the IMU data and each of the plurality of pose measurement vectors, and determining the device pose estimate based on the updated state of the multi-measurement estimation filter bank.

Clause 3. The method of clause 2, where the multi-measurement estimation filter bank comprises a state buffer, and where updating the state of the multi-measurement estimation filter bank based on the IMU data and each of the plurality of pose measurement vectors includes performing, for each of the plurality of pose measurement vectors, a respective update of the state buffer.

Clause 4. The method of any of clauses 1 to 3, where each pose measurement vector of the plurality of pose measurement vectors includes one or more measurement parameters, including a respective measurement parameter for each of one or more dimensions, and one or more uncertainty parameters, including a respective uncertainty parameter for each of the one or more measurement parameters.

Clause 5. The method of clause 4, where for each of the one or more dimensions, the one or more measurement parameters include a respective position measurement parameter, a respective orientation measurement parameter, or a combination of both, and for each of the one or more dimensions, the one or more uncertainty parameters include a respective position uncertainty parameter, a respective orientation uncertainty parameter, or a combination of both.

Clause 6. The method of any of clauses 1 to 5, where the device pose estimate includes, for each of the one or more dimensions a respective position estimate parameter, a respective orientation estimate parameter, or a combination of both.

Clause 7. The method of clause 6, including, for each of the one or more dimensions determining the respective position estimate parameter for that dimension by weighting respective position measurement parameters for that dimension among position measurement parameters of the plurality of pose measurement vectors according to respective position uncertainty parameters for that dimension among position uncertainty parameters of the plurality of pose measurement vectors, determining the respective orientation estimate parameter for that dimension by weighting respective orientation measurement parameters for that dimension among orientation measurement parameters of the plurality of pose measurement vectors according to respective orientation uncertainty parameters for that dimension among orientation uncertainty parameters of the plurality of pose measurement vectors, or a combination of the above.

Clause 8. The method of any of clauses 1 to 7, where each of the multiple motion classes corresponds to a different respective time interval value.

Clause 9. The method of any of clauses 1 to 8, including selecting at least one of the plurality of machine-learning models based on one or more navigation context parameters.

Clause 10. The method of clause 9, including adjusting uncertainty parameters associated with a machine-learning model among the plurality of machine-learning models based on the one or more navigation context parameters, resulting in adjusted uncertainty parameters, and weighting a pose measurement vector associated with the machine-learning model according to the adjusted uncertainty parameters.

Clause 11. The method of any of clauses 1 to 10, including obtaining sensor information from one or more sensors, and determining the device pose estimate based on the IMU data, each of the plurality of pose measurement vectors, and the sensor information.

Clause 12. The method of clause 11, where the one or more sensors include one or more of a camera, a radar sensor, a pressure sensor, an ultrasound sensor, and a global navigation satellite system (GNSS) receiver.

Clause 13. The method of any of clauses 11 to 12, including selecting, based on uncertainty parameters of the plurality of pose measurement vectors, one or more types of supplemental measurements as inputs for determining the device pose estimate, and obtaining the sensor information from the one or more sensors based on the one or more selected types of supplemental measurements.

Clause 14. An apparatus for inertial navigation, including an inertial measurement unit (IMU), a transceiver, a memory, and one or more processors communicatively coupled with the transceiver and the memory, where the one or more processors are configured to obtain IMU data from the IMU, generate, based on the IMU data, a respective pose measurement vector according to each of a plurality of machine-learning models, resulting in a plurality of pose measurement vectors, where each of the plurality of pose measurement vectors is associated with a respective one of multiple motion classes, and determine a device pose estimate based on the IMU data and each of the plurality of pose measurement vectors.

Clause 15. The apparatus of clause 14, where to determine the device pose estimate based on the IMU data and each of the plurality of pose measurement vectors, the one or more processors are configured to update a state of a multi-measurement estimation filter bank based on the IMU data and each of the plurality of pose measurement vectors, and determine the device pose estimate based on the updated state of the multi-measurement estimation filter bank.

Clause 16. The apparatus of clause 15, where the multi-measurement estimation filter bank comprises a state buffer, and where to update the state of the multi-measurement estimation filter bank based on the IMU data and each of the plurality of pose measurement vectors, the one or more processors are configured to perform, for each of the plurality of pose measurement vectors, a respective update of the state buffer.

Clause 17. The apparatus of any of clauses 14 to 16, where each pose measurement vector of the plurality of pose measurement vectors includes one or more measurement parameters, including a respective measurement parameter for each of one or more dimensions, and one or more uncertainty parameters, including a respective uncertainty parameter for each of the one or more measurement parameters.

Clause 18. The apparatus of clause 17, where for each of the one or more dimensions, the one or more measurement parameters include a respective position measurement parameter, a respective orientation measurement parameter, or a combination of both, and for each of the one or more dimensions, the one or more uncertainty parameters include a respective position uncertainty parameter, a respective orientation uncertainty parameter, or a combination of both.

Clause 19. The apparatus of any of clauses 14 to 18, where the device pose estimate includes, for each of the one or more dimensions a respective position estimate parameter, a respective orientation estimate parameter, or a combination of both.

Clause 20. The apparatus of clause 19, where to determine the device pose estimate based on the IMU data and each of the plurality of pose measurement vectors, the one or more processors are configured to, for each of the one or more dimensions determine the respective position estimate parameter for that dimension by weighting respective position measurement parameters for that dimension among position measurement parameters of the plurality of pose measurement vectors according to respective position uncertainty parameters for that dimension among position uncertainty parameters of the plurality of pose measurement vectors, determine the respective orientation estimate parameter for that dimension by weighting respective orientation measurement parameters for that dimension among orientation measurement parameters of the plurality of pose measurement vectors according to respective orientation uncertainty parameters for that dimension among orientation uncertainty parameters of the plurality of pose measurement vectors, or a combination of the above.

Clause 21. The apparatus of any of clauses 14 to 20, where each of the multiple motion classes corresponds to a different respective time interval value.

Clause 22. The apparatus of any of clauses 14 to 21, where the one or more processors are configured to select at least one of the plurality of machine-learning models based on one or more navigation context parameters.

Clause 23. The apparatus of clause 22, where the one or more processors are configured to adjust uncertainty parameters associated with a machine-learning model among the plurality of machine-learning models based on the one or more navigation context parameters, resulting in adjusted uncertainty parameters, and weight a pose measurement vector associated with the machine-learning model according to the adjusted uncertainty parameters.

Clause 24. The apparatus of any of clauses 14 to 23, where the one or more processors are configured to obtain sensor information from one or more sensors, and determine the device pose estimate based on the IMU data, each of the plurality of pose measurement vectors, and the sensor information.

Clause 25. The apparatus of clause 24, where the one or more sensors include one or more of a camera, a radar sensor, a pressure sensor, an ultrasound sensor, and a global navigation satellite system (GNSS) receiver.

Clause 26. The apparatus of any of clauses 24 to 25, where the one or more processors are configured to select, based on uncertainty parameters of the plurality of pose measurement vectors, one or more types of supplemental measurements as inputs for determining the device pose estimate, and obtain the sensor information from the one or more sensors based on the one or more selected types of supplemental measurements.

Clause 27. An apparatus for inertial navigation, including means for obtaining inertial measurement unit (IMU) data from an IMU, means for generating, based on the IMU data, a respective pose measurement vector according to each of a plurality of machine-learning models, resulting in a plurality of pose measurement vectors, where each of the plurality of pose measurement vectors is associated with a respective one of multiple motion classes, and means for determining a device pose estimate based on the IMU data and each of the plurality of pose measurement vectors.

Clause 28. The apparatus of clause 27, where the means for determining the device pose estimate based on the IMU data and each of the plurality of pose measurement vectors includes means for updating a state of a multi-measurement estimation filter bank based on the IMU data and each of the plurality of pose measurement vectors, and means for determining the device pose estimate based on the updated state of the multi-measurement estimation filter bank.

Clause 29. The apparatus of clause 28, where the multi-measurement estimation filter bank comprises a state buffer, and where the means for updating the state of the multi-measurement estimation filter bank based on the IMU data and each of the plurality of pose measurement vectors includes means for performing, for each of the plurality of pose measurement vectors, a respective update of the state buffer.

Clause 30. The apparatus of any of clauses 27 to 29, where each pose measurement vector of the plurality of pose measurement vectors includes one or more measurement parameters, including a respective measurement parameter for each of one or more dimensions, and one or more uncertainty parameters, including a respective uncertainty parameter for each of the one or more measurement parameters.

Clause 31. The apparatus of clause 30, where for each of the one or more dimensions, the one or more measurement parameters include a respective position measurement parameter, a respective orientation measurement parameter, or a combination of both, and for each of the one or more dimensions, the one or more uncertainty parameters include a respective position uncertainty parameter, a respective orientation uncertainty parameter, or a combination of both.

Clause 32. The apparatus of any of clauses 27 to 31, where the device pose estimate includes, for each of the one or more dimensions a respective position estimate parameter, a respective orientation estimate parameter, or a combination of both.

Clause 33. The apparatus of clause 32, including means for, for each of the one or more dimensions determining the respective position estimate parameter for that dimension by weighting respective position measurement parameters for that dimension among position measurement parameters of the plurality of pose measurement vectors according to respective position uncertainty parameters for that dimension among position uncertainty parameters of the plurality of pose measurement vectors, determining the respective orientation estimate parameter for that dimension by weighting respective orientation measurement parameters for that dimension among orientation measurement parameters of the plurality of pose measurement vectors according to respective orientation uncertainty parameters for that dimension among orientation uncertainty parameters of the plurality of pose measurement vectors, or a combination of the above.

Clause 34. The apparatus of any of clauses 27 to 33, where each of the multiple motion classes corresponds to a different respective time interval value.

Clause 35. The apparatus of any of clauses 27 to 34, including means for selecting at least one of the plurality of machine-learning models based on one or more navigation context parameters.

Clause 36. The apparatus of clause 35, including means for adjusting uncertainty parameters associated with a machine-learning model among the plurality of machine-learning models based on the one or more navigation context parameters, resulting in adjusted uncertainty parameters, and means for weighting a pose measurement vector associated with the machine-learning model according to the adjusted uncertainty parameters.

Clause 37. The apparatus of any of clauses 27 to 36, including means for obtaining sensor information from one or more sensors, and means for determining the device pose estimate based on the IMU data, each of the plurality of pose measurement vectors, and the sensor information.

Clause 38. The apparatus of clause 37, where the one or more sensors include one or more of a camera, a radar sensor, a pressure sensor, an ultrasound sensor, and a global navigation satellite system (GNSS) receiver.

Clause 39. The apparatus of any of clauses 37 to 38, including means for selecting, based on uncertainty parameters of the plurality of pose measurement vectors, one or more types of supplemental measurements as inputs for determining the device pose estimate, and means for obtaining the sensor information from the one or more sensors based on the one or more selected types of supplemental measurements.

Clause 40. A non-transitory computer-readable medium storing instructions for inertial navigation, the instructions including code for obtaining inertial measurement unit (IMU) data from an IMU, generating, based on the IMU data, a respective pose measurement vector according to each of a plurality of machine-learning models, resulting in a plurality of pose measurement vectors, where each of the plurality of pose measurement vectors is associated with a respective one of multiple motion classes, and determining a device pose estimate based on the IMU data and the plurality of pose measurement vectors.

Clause 41. The non-transitory computer-readable medium of clause 40, the instructions including code for updating a state of a multi-measurement estimation filter bank based on the IMU data and each of the plurality of pose measurement vectors, and determining the device pose estimate based on the updated state of the multi-measurement estimation filter bank.

Clause 42. The non-transitory computer-readable medium of clause 41, where the multi-measurement estimation filter bank comprises a state buffer, and where updating the state of the multi-measurement estimation filter bank based on the IMU data and each of the plurality of pose measurement vectors includes performing, for each of the plurality of pose measurement vectors, a respective update of the state buffer.

Clause 43. The non-transitory computer-readable medium of any of clauses 40 to 42, where each pose measurement vector of the plurality of pose measurement vectors includes one or more measurement parameters, including a respective measurement parameter for each of one or more dimensions, and one or more uncertainty parameters, including a respective uncertainty parameter for each of the one or more measurement parameters.

Clause 44. The non-transitory computer-readable medium of clause 43, where for each of the one or more dimensions, the one or more measurement parameters include a respective position measurement parameter, a respective orientation measurement parameter, or a combination of both, and for each of the one or more dimensions, the one or more uncertainty parameters include a respective position uncertainty parameter, a respective orientation uncertainty parameter, or a combination of both.

Clause 45. The non-transitory computer-readable medium of any of clauses 40 to 44, where the device pose estimate includes, for each of the one or more dimensions a respective position estimate parameter, a respective orientation estimate parameter, or a combination of both.

Clause 46. The non-transitory computer-readable medium of clause 45, the instructions including code for, for each of the one or more dimensions determining the respective position estimate parameter for that dimension by weighting respective position measurement parameters for that dimension among position measurement parameters of the plurality of pose measurement vectors according to respective position uncertainty parameters for that dimension among position uncertainty parameters of the plurality of pose measurement vectors, determining the respective orientation estimate parameter for that dimension by weighting respective orientation measurement parameters for that dimension among orientation measurement parameters of the plurality of pose measurement vectors according to respective orientation uncertainty parameters for that dimension among orientation uncertainty parameters of the plurality of pose measurement vectors, or a combination of the above.

Clause 47. The non-transitory computer-readable medium of any of clauses 40 to 46, where each of the multiple motion classes corresponds to a different respective time interval value.

Clause 48. The non-transitory computer-readable medium of any of clauses 40 to 47, the instructions including code for selecting at least one of the plurality of machine-learning models based on one or more navigation context parameters.

Clause 49. The non-transitory computer-readable medium of clause 48, the instructions including code for adjusting uncertainty parameters associated with a machine-learning model among the plurality of machine-learning models based on the one or more navigation context parameters, resulting in adjusted uncertainty parameters, and weighting a pose measurement vector associated with the machine-learning model according to the adjusted uncertainty parameters.

Clause 50. The non-transitory computer-readable medium of any of clauses 40 to 49, the instructions including code for obtaining sensor information from one or more sensors, and determining the device pose estimate based on the IMU data, each of the plurality of pose measurement vectors, and the sensor information.

Clause 51. The non-transitory computer-readable medium of clause 50, where the one or more sensors include one or more of a camera, a radar sensor, a pressure sensor, an ultrasound sensor, and a global navigation satellite system (GNSS) receiver.

Clause 52. The non-transitory computer-readable medium of any of clauses 50 to 51, the instructions including code for selecting, based on uncertainty parameters of the plurality of pose measurement vectors, one or more types of supplemental measurements as inputs for determining the device pose estimate, and obtaining the sensor information from the one or more sensors based on the one or more selected types of supplemental measurements.

What is claimed is:

1. A method for inertial navigation, comprising:

obtaining inertial measurement unit (IMU) data from a single IMU of a single device;

generating, based on the IMU data obtained from the single IMU of the single device, a respective pose measurement vector according to each of a plurality of machine-learning models, resulting in a plurality of pose measurement vectors, wherein each of the plurality of pose measurement vectors is associated with a respective one of multiple motion classes, wherein each of the multiple motion classes corresponds to a different respective time interval value, wherein each of the plurality of machine-learning models generates the respective pose measurement vector based on a respective window of the IMU data having a duration corresponding to the respective time interval value of the motion class associated with that machine-learning model, and wherein each pose measurement vector indicates a change in at least one of position or orientation of the single device occurring over the respective time interval value corresponding to the motion class associated with that pose measurement vector; and determining a device pose estimate for the single device based on the IMU data and the plurality of pose measurement vectors, the determining comprising:

updating a state of a multi-measurement estimation filter bank based on the IMU data and each of the plurality of pose measurement vectors; and determining the pose estimate based on the updated state of the multi-measurement estimation filter bank.

2. The method of claim 1, wherein the multi-measurement estimation filter bank comprises a state buffer, and wherein updating the state of the multi-measurement estimation filter bank based on the IMU data and each of the plurality of pose measurement vectors includes performing, for each of the plurality of pose measurement vectors, a respective update of the state buffer.

3. The method of claim 2, wherein the respective update of the state buffer spans a number of buffer elements of the state buffer corresponding to the time interval value associated with that pose measurement vector.

4. The method of claim 1, wherein each pose measurement vector of the plurality of pose measurement vectors comprises:

one or more measurement parameters, including a respective measurement parameter for each of one or more dimensions; and one or more uncertainty parameters, including a respective uncertainty parameter for each of the one or more measurement parameters.

5. The method of claim 4, wherein:

for each of the one or more dimensions, the one or more measurement parameters include:

a respective position measurement parameter;

a respective orientation measurement parameter; or a combination of both; and for each of the one or more dimensions, the one or more uncertainty parameters include:

a respective position uncertainty parameter;

a respective orientation uncertainty parameter; or a combination of both.

6. The method of claim 4, wherein the device pose estimate comprises, for each of the one or more dimensions:

a respective position estimate parameter;

a respective orientation estimate parameter; or a combination of both.

7. The method of claim 6, comprising, for each of the one or more dimensions:

determining the respective position estimate parameter for that dimension by weighting respective position measurement parameters for that dimension among position measurement parameters of the plurality of pose measurement vectors according to respective position uncertainty parameters for that dimension among position uncertainty parameters of the plurality of pose measurement vectors;

determining the respective orientation estimate parameter for that dimension by weighting respective orientation measurement parameters for that dimension among orientation measurement parameters of the plurality of pose measurement vectors according to respective orientation uncertainty parameters for that dimension among orientation uncertainty parameters of the plurality of pose measurement vectors; or a combination of the above.

8. The method of claim 1, wherein the plurality of machine-learning models comprises at least three machine-learning models associated with at least three different time interval values.

9. The method of claim 1, comprising selecting at least one of the plurality of machine-learning models based on one or more navigation context parameters.

10. The method of claim 9, comprising:

adjusting uncertainty parameters associated with a machine-learning model among the plurality of machine-learning models based on the one or more navigation context parameters to produce adjusted uncertainty parameters; and weighting a pose measurement vector associated with the machine-learning model according to the adjusted uncertainty parameters.

11. The method of claim 1, comprising:

obtaining sensor information from one or more sensors; and determining the device pose estimate based on the IMU data, each of the plurality of pose measurement vectors, and the sensor information.

12. The method of claim 11, wherein the one or more sensors include one or more of a camera, a radar sensor, a pressure sensor, an ultrasound sensor, and a global navigation satellite system (GNSS) receiver.

13. The method of claim 11, comprising:

selecting, based on uncertainty parameters of the plurality of pose measurement vectors, one or more types of supplemental measurements as inputs for determining the device pose estimate; and obtaining the sensor information from the one or more sensors based on the one or more selected types of supplemental measurements.

14. An apparatus for inertial navigation, comprising:

a single inertial measurement unit (IMU);

a transceiver;

a memory; and one or more processors communicatively coupled with the transceiver and the memory, wherein the one or more processors are configured to:

obtain IMU data from the single IMU of the apparatus;

generate, based on the IMU data obtained from the single IMU of the apparatus, a respective pose measurement vector according to each of a plurality of machine-learning models, resulting in a plurality of pose measurement vectors, wherein each of the plurality of pose measurement vectors is associated with a respective one of multiple motion classes, wherein each of the multiple motion classes corresponds to a different respective time interval value, wherein each of the plurality of machine-learning models generates the respective pose measurement vector based on a respective window of the IMU data having a duration corresponding to the respective time interval value of the motion class associated with that machine-learning model, and wherein each pose measurement vector indicates a change in at least one of position or orientation of the apparatus occurring over the respective time interval value corresponding to the motion class associated with that pose measurement vector; and determine a device pose estimate for the apparatus based on the IMU data and the plurality of pose measurement vectors, wherein to determine the pose estimate the one or more processors are configured to:

update a state of a multi-measurement estimation filter bank based on the IMU data and each of the plurality of pose measurement vectors; and determine the pose estimate based on the updated state of the multi-measurement estimation filter bank.

15. The apparatus of claim 14, wherein the multi-measurement estimation filter bank comprises a state buffer, and wherein to update the state of the multi-measurement estimation filter bank based on the IMU data and each of the plurality of pose measurement vectors, the one or more processors are configured to perform, for each of the plurality of pose measurement vectors, a respective update of the state buffer.

16. The apparatus of claim 15, wherein the respective update of the state buffer spans a number of buffer elements of the state buffer corresponding to the time interval value associated with that pose measurement vector.

17. The apparatus of claim 14, wherein each pose measurement vector of the plurality of pose measurement vectors comprises:

one or more measurement parameters, including a respective measurement parameter for each of one or more dimensions; and one or more uncertainty parameters, including a respective uncertainty parameter for each of the one or more measurement parameters.

18. The apparatus of claim 17, wherein:

for each of the one or more dimensions, the one or more measurement parameters include:

a respective position measurement parameter;

a respective orientation measurement parameter; or a combination of both; and for each of the one or more dimensions, the one or more uncertainty parameters include:

a respective position uncertainty parameter;

a respective orientation uncertainty parameter; or a combination of both.

19. The apparatus of claim 17, wherein the device pose estimate comprises, for each of the one or more dimensions:

a respective position estimate parameter;

a respective orientation estimate parameter; or a combination of both.

20. The apparatus of claim 19, wherein to determine the device pose estimate based on the IMU data and each of the plurality of pose measurement vectors, the one or more processors are configured to, for each of the one or more dimensions:

determine the respective position estimate parameter for that dimension by weighting respective position measurement parameters for that dimension among position measurement parameters of the plurality of pose measurement vectors according to respective position uncertainty parameters for that dimension among position uncertainty parameters of the plurality of pose measurement vectors;

determine the respective orientation estimate parameter for that dimension by weighting respective orientation measurement parameters for that dimension among orientation measurement parameters of the plurality of pose measurement vectors according to respective orientation uncertainty parameters for that dimension among orientation uncertainty parameters of the plurality of pose measurement vectors; or a combination of the above.

21. The apparatus of claim 14, wherein the plurality of machine-learning models comprises at least three machine-learning models associated with at least three different time interval values.

22. The apparatus of claim 14, wherein the one or more processors are configured to select at least one of the plurality of machine-learning models based on one or more navigation context parameters.

23. The apparatus of claim 22, wherein the one or more processors are configured to:

adjust uncertainty parameters associated with a machine-learning model among the plurality of machine-learning models based on the one or more navigation context parameters to produce adjusted uncertainty parameters; and weight a pose measurement vector associated with the machine-learning model according to the adjusted uncertainty parameters.

24. The apparatus of claim 14, wherein the one or more processors are configured to:

obtain sensor information from one or more sensors; and determine the device pose estimate based on the IMU data, each of the plurality of pose measurement vectors, and the sensor information.

25. The apparatus of claim 24, wherein the one or more sensors include one or more of a camera, a radar sensor, a pressure sensor, an ultrasound sensor, and a global navigation satellite system (GNSS) receiver.

26. The apparatus of claim 24, wherein the one or more processors are configured to:

select, based on uncertainty parameters of the plurality of pose measurement vectors, one or more types of supplemental measurements as inputs for determining the device pose estimate; and obtain the sensor information from the one or more sensors based on the one or more selected types of supplemental measurements.

27. An apparatus for inertial navigation, comprising:

means for obtaining inertial measurement unit (IMU) data from a single IMU of the apparatus;

means for generating, based on the IMU data obtained from the single IMU of the apparatus, a respective pose measurement vector according to each of a plurality of machine-learning models, resulting in a plurality of pose measurement vectors, wherein each of the plurality of pose measurement vectors is associated with a respective one of multiple motion classes, wherein each of the multiple motion classes corresponds to a different respective time interval value, wherein each of the plurality of machine-learning models generates the respective pose measurement vector based on a respective window of the IMU data having a duration corresponding to the respective time interval value of the motion class associated with that machine-learning model, and wherein each pose measurement vector indicates a change in at least one of position or orientation of the apparatus occurring over the respective time interval value corresponding to the motion class associated with that pose measurement vector; and means for determining a device pose estimate for the apparatus based on the IMU data and each of the plurality of pose measurement vectors, the means for determining including:

means for updating a state of a multi-measurement estimation filter bank based on the IMU data and each of the plurality of pose measurement vectors; and means for determining the pose estimate based on the updated state of the multi-measurement estimation filter bank.

28. The apparatus of claim 27, wherein the multi-measurement estimation filter bank comprises a state buffer, and wherein the means for updating the state of the multi-measurement estimation filter bank based on the IMU data and each of the plurality of pose measurement vectors includes means for performing, for each of the plurality of pose measurement vectors, a respective update of the state buffer.

29. The apparatus of claim 28, wherein the respective update of the state buffer spans a number of buffer elements of the state buffer corresponding to the time interval value associated with that pose measurement vector.

30. The apparatus of claim 27, wherein the plurality of machine-learning models comprises at least three machine-learning models associated with at least three different time interval values.

* * * * *